United States Patent [19]
Nakakura

[11] Patent Number: 5,204,832
[45] Date of Patent: Apr. 20, 1993

[54] ADDITION APPARATUS HAVING ROUND-OFF FUNCTION

[75] Inventor: Yasuhiro Nakakura, Osaka, Japan

[73] Assignee: Matsushita Electric Industrial Co., Ltd., Osaka, Japan

[21] Appl. No.: 673,824

[22] Filed: Mar. 22, 1991

[30] Foreign Application Priority Data

Mar. 22, 1990 [JP] Japan .................................. 2-74177

[51] Int. Cl.$^5$ .......................... G06F 7/50; G06F 7/38; G06F 7/52
[52] U.S. Cl. .................................. 364/788; 364/745; 364/754
[58] Field of Search .............. 364/740, 741, 745, 748, 364/770, 788, 784, 785, 786, 787

[56] References Cited

U.S. PATENT DOCUMENTS

| | | | |
|---|---|---|---|
| 4,682,303 | 7/1987 | Uya | 364/788 |
| 4,839,846 | 6/1989 | Hirose et al. | 364/748 |
| 5,018,093 | 5/1991 | Shih | 364/740 |

Primary Examiner—Long T. Nguyen
Assistant Examiner—Chuong D. Ngo
Attorney, Agent, or Firm—Lowe, Price, LeBlanc & Becker

[57] ABSTRACT

An addition apparatus adds together two numbers while detecting one of a plurality (n) of possible round-off positions and executing round-off at that position simultaneously with adding together the numbers. The apparatus is divided into a plurality of circuit sections. In a first section, two lowest-significance portions of the two numbers are added together in each of n parallel adder circuits while executing round-off processing at respectively different bit positions in each of the adder circuits. In each of subsequent sections, portions of increasing significance of the two input numbers are added together in a first parallel adder to which a "1" state input carry is applied and a second parallel adder in which a "0" state carry is supplied, and in each section, n section carry signals are generated in accordance with carry outputs produced from the adders of that section and respective section carry signals produced from the preceding section. A control signal for selecting the output sum from one of the parallel adders of the lowest-significance section and thereby determining the round-off position is generated based on a combination of carry signals supplied to the highest-significance circuit section and MSB signals produced from the two parallel adders of that section.

6 Claims, 16 Drawing Sheets

ADDITION APPARATUS HAVING ROUND-OFF FUNCTION

BACKGROUND OF THE INVENTION

1. Field of the Invention

The present invention relates to an apparatus for parallel addition of two binary data values to obtain an intermediate processing result, such as addition of two floating-point mantissas or addition of two partial processing values obtained during a multiplication or division operation executed upon two floating-point mantissas, and for executing round-off processing of that intermediate result.

In particular, the invention relates to such an addition apparatus which also includes a capability for detecting an appropriate one of a plurality of possible bit position at which round-off is to be executed within the intermediate processing result.

2. Description of the Prior Art

When two floating-point number mantissas are added together, or when two intermediate results of certain floating-point arithmetic operations are added together, e.g. adding together two partial products to obtain the intermediate product which is to be subjected to round-off processing, in the case of a multiplication operation, there may be a plurality of different possible positions at which round-off processing of the result of that addition can be executed. For example, when two 25-bit floating-point values each having the normalized format designated by numeral 10 in FIG. 1 (i.e. *.** ... *, where * denotes an arbitrary "0" or "1" bit state) are added together, then an intermediate sum will be obtained having the format designated by numeral 11, i.e. XX.XX . . . XX. If a carry up from the bit 24 position has occurred as a result of the addition, then the leading bit (bit 25) of the addition result will be "1", i.e. the sum format will be as indicated by numeral 16. In that case, assuming that there are only two possible round-off positions, the position designated by 15 will be selected as the round-off position, where "1" will be added to execute round-off. After round-off has been executed, the most significant 25 bits of the result will be outputted as the final sum, designated by numeral 18, by a right-shift operation. If no carry up has occurred, then the leading bit of the result will be "0", and the sum format will be as indicated by numeral 12. In that case, the round-off position will be the bit 0 position (LSB), and the 25 bits extending from and including bit 0 of the result obtained from the round-off processing will then be outputted as the final sum result, after any necessary left-shifting has been executed if required to normalize the result.

In the following, a bit position in an intermediate processing result which corresponds to the LSB position in a normalized floating-point mantissa (such as the value designated as 10 in FIG. 1) will be referred to as the normalized LSB position, since there may be bits of lower significance than that position in such an intermediate result.

Similar considerations apply when two partial processing results of a multiplication or division operation are added together, e.g. when two final partial products are added together to obtain an intermediate product, which is then subjected to round-off processing, followed by a shift operation if necessary.

With the round-off method described above there are two possible round-off bit positions, determined in accordance with the state of the MSB of the addition result. However with another method, there are three positions, which are determined in accordance with a combination of states of the two leading bits of the intermediate sum.

In the prior art it has been necessary to use one addition circuit for parallel addition of the two input values or partial products, then to detect the state of the MSB (or the two leading bits) in the intermediate sum or intermediate product that results from the addition, then to use another addition circuit as a round-off adder, with the round-off bit position being determined in accordance with the detected MSB state, or combination of states of the two leading bits of the intermediate sum or intermediate product. Thus, a significant amount of time is required to execute round-off processing, while in addition a separate addition circuit is required to execute round-off.

SUMMARY OF THE INVENTION

It is an object of the present invention to provide an addition apparatus having a round-off function, whereby it becomes possible to simultaneously add together two normalized floating-point values to obtain an intermediate processing result while also detecting a correct one of a plurality of possible round-off bit positions in that intermediate processing result, where the floating-point values may be two input values that are to be added together, or two partial processing results such as two finally obtained partial products derived in a multiplication operation executed on two input values. It is moreover an objective of the present invention to provide an addition apparatus having a round-off function whereby the same addition circuit executes both addition of the two input values and also round-off addition. In this way, faster operation and reduction of circuit scale can be achieved than is possible with a prior art apparatus in which it is necessary to first add together two data values to obtain an intermediate processing result, then to detect conditions of specific bits in the intermediate processing result to determine the bit position at which round-off is to be executed, and to then use a separate round-off addition circuit to execute the actual round-off operation.

To achieve the above objectives, according to one aspect of the invention, the invention provides an addition apparatus having a round-off function for adding together first and second input binary numbers and executing round-off processing of a result of the addition, comprising:

a first circuit section including n parallel adders where n is a fixed integer, each parallel adder coupled to add together respective first portions of said input numbers, each portion comprising a fixed number of bits extending from and including a bit at a least significant bit position of said input numbers, said parallel adders being operable for executing round-off addition at n respectively different bit positions, and said parallel adders generating n respective carry output signals which are outputted from said first circuit section as respective section carry output signals, said first circuit section further including data selector means controllable for selecting one out of n respective sets of bits constituting sum results produced from said n parallel adders of the first circuit section and for outputting the selected sum result;

a plurality of intermediate circuit sections coupled to receive respective pairs of portions of said input numbers, said pairs successively increasing in significance above said first portions, each of said intermediate circuit sections including a first parallel adder for adding together the pair of numeral portions supplied to the circuit section while fixedly adding a "1" state input carry thereto, and a second parallel adder for adding together the pair of numeral portions supplied to the circuit section while fixely adding a "0" state input carry thereto, data selector means controllable for selecting one out of 2 respective sets of bits constituting sum results produced from said first and second parallel adders of the circuit section parallel adders and for outputting the selected sum result, carry selector means operable for selecting one out of n carry signals supplied from a preceding one of said circuit sections and for applying a selected carry signal to control said data selector means, and n section carry generating circuits each receiving respective carry output signals produced from said first and second parallel adders and a corresponding one of n carry output signals produced from a preceding one of said circuit sections, for generating n respective carry output signals; and a final circuit section coupled to receive respective most significant portions of said input numbers, including a first parallel adder for adding together said most significant portions while fixely adding a "1" state input carry thereto, and a second parallel adder for adding together said most significant portions while fixely adding a "0" state input carry thereto, data selector means controllable for selecting one out of 2 respective sets of bits each constituting a carry bit and sum result produced from said first and second parallel adders of the circuit section and for outputting the selected set of bits, carry selector means operable for selecting one out of n carry signals supplied from a preceding one of said circuit sections and for applying a selected carry signal to control said data selector means, and round-off position setting circuit means coupled to receive said n carry signals supplied from the preceding circuit section and to receive respective most significant bits that are produced as carry outputs from said first and second parallel adders respectively, and including logic circuit means responsive to a combination of logic states of said input carry signals and most significant bits for producing corresponding output signals for controlling said respective data selector means and said carry selection means of said circuit sections, to thereby determine a position at which round-off processing has been executed to obtain an output result formed of the output bits produced from said data selector means.

DESCRIPTION OF PREFERRED EMBODIMENTS

Before describing embodiments of the present invention, an example of prior art addition apparatus having a round-off function will be described, referring to FIG. 2. Here, it will be assumed that input data values which are floating-point numbers, each having a total of 106 bits, are to be added together, and that these numbers have been generated as partial products in a multiplication operation, i.e. that two 53-bit normalized floating-point numbers have been processed, for example by by an array adder to obtain a sum value (bits A105 to A0) and a carry value (B105 to B0) as two final partial products. An intermediate product is obtained by adding these input data values together. That addition is executed in a 2-input parallel addition circuit 1001. The intermediate product obtained from the addition circuit 1001 will be in the form . - - - *, where * denotes a bit that can be either in the "1" or "0" state. The MSB (most significant bit) of the intermediate product is supplied to a round-off position detection circuit 1002, which determines whether the MSB is in the "1" or the "0" state. If the MSB is "1", indicating that carry up to the MSB position has occurred by the addition executed in circuit 1001, then the round-off position detection circuit 1002 controls the operation of a 2-input addition circuit 1003 such as to execute round-off by adding "1" to a specific position in the intermediate product, immediately above the normalized LSB position.

Figure 1:
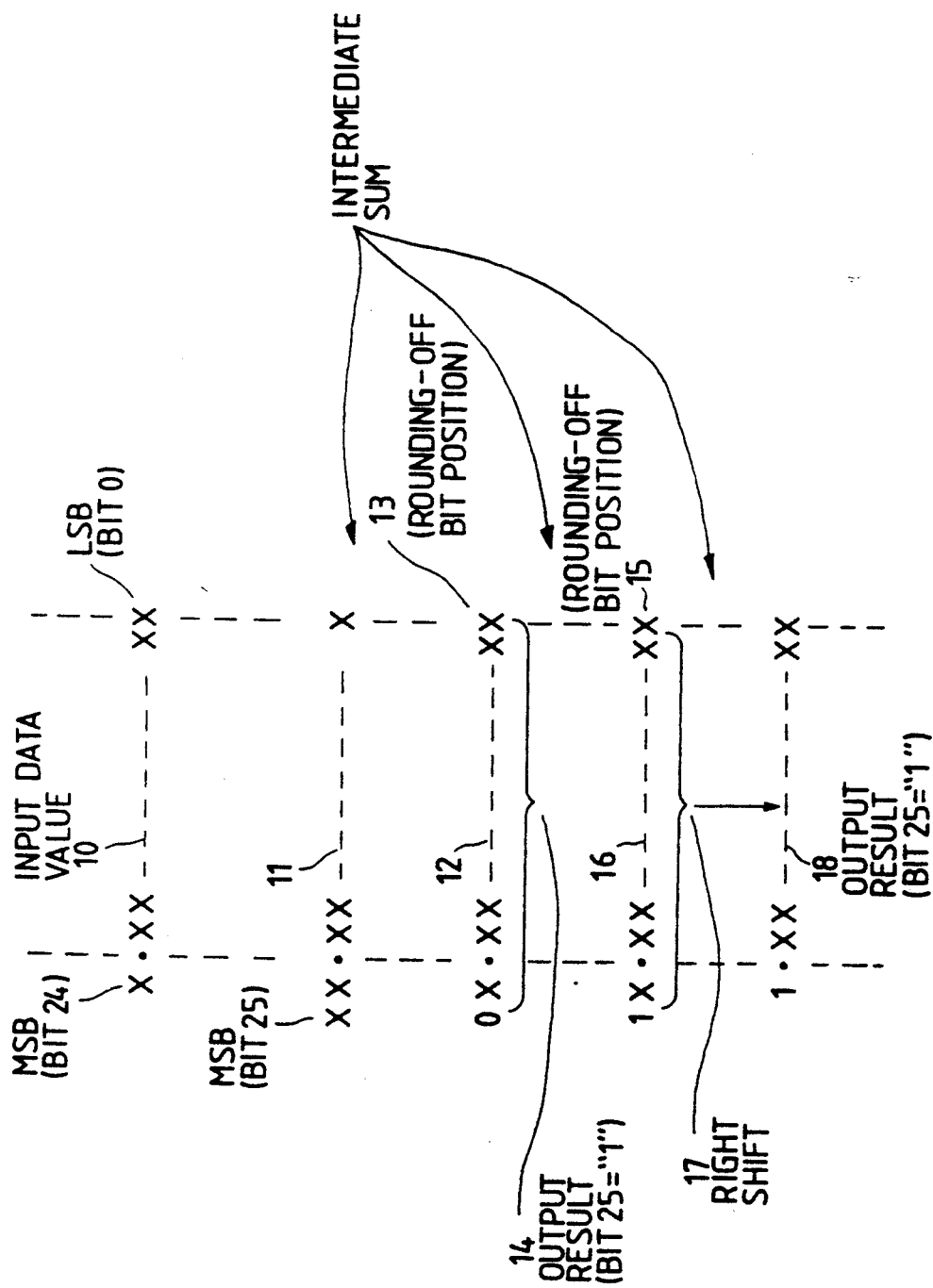
FIG. 1 is a diagram for assistance in describing floating-point mantissa addition and multiplication operations.

The upper 53 bits of the result obtained from the 2-input addition circuit 1003, including the MSB, are then supplied to a shift circuit 1004, to be right-shifted by one bit position, and obtain the final result (i.e. result 18 in FIG. 1). If the MSB of the intermediate product produced from the 2-input addition circuit 1001 is "0", then the round-off position detection circuit 1002 causes "1" to be added to the LSB position of the intermediate product, by the 2-input addition circuit 1003. The 53 bits extending from immediately below the MSB position in the output result from the 2-input addition circuit 1003 are then transferred through the shift circuit 1004, without being shifted, and outputted as the final result.

In the above it is assumed that there are only two possible round-off bit position that can be detected by the round-off position detection circuit 1002. However, depending upon the round-off method there may be a greater number of round-off bit positions, for example three possible round-off bit positions that are respectively determined in accordance with combinations of conditions of the two leading bits of the intermediate product produced from the 2-input addition circuit 1001. In that case it may for example be arranged that the round-off bit position will differ in accordance with whether the most significant bits of the intermediate product are 1*.***** ..., 01.* ..., or 00.****** ...

Thus with the prior art, to execute round-off of an intermediate processing result obtained in an operation such as a floating-point addition or floating-point multiplication, it is necessary to first add together two input data values to obtain that intermediate processing result, then to detect (based upon the condition of at least one specific bit in that intermediate processing result) the position in that intermediate processing result at which "1" is to be added to execute round-off, then to execute that round-off addition by using a round-off addition circuit.

Similar operations must be executed when two floating-point numbers are to be directly added together, and round-off processing then executed in accordance with whether a carry up from the MSB position has occurred as a result of the addition, as described hereinabove referring to FIG. 1.

Figure 3:
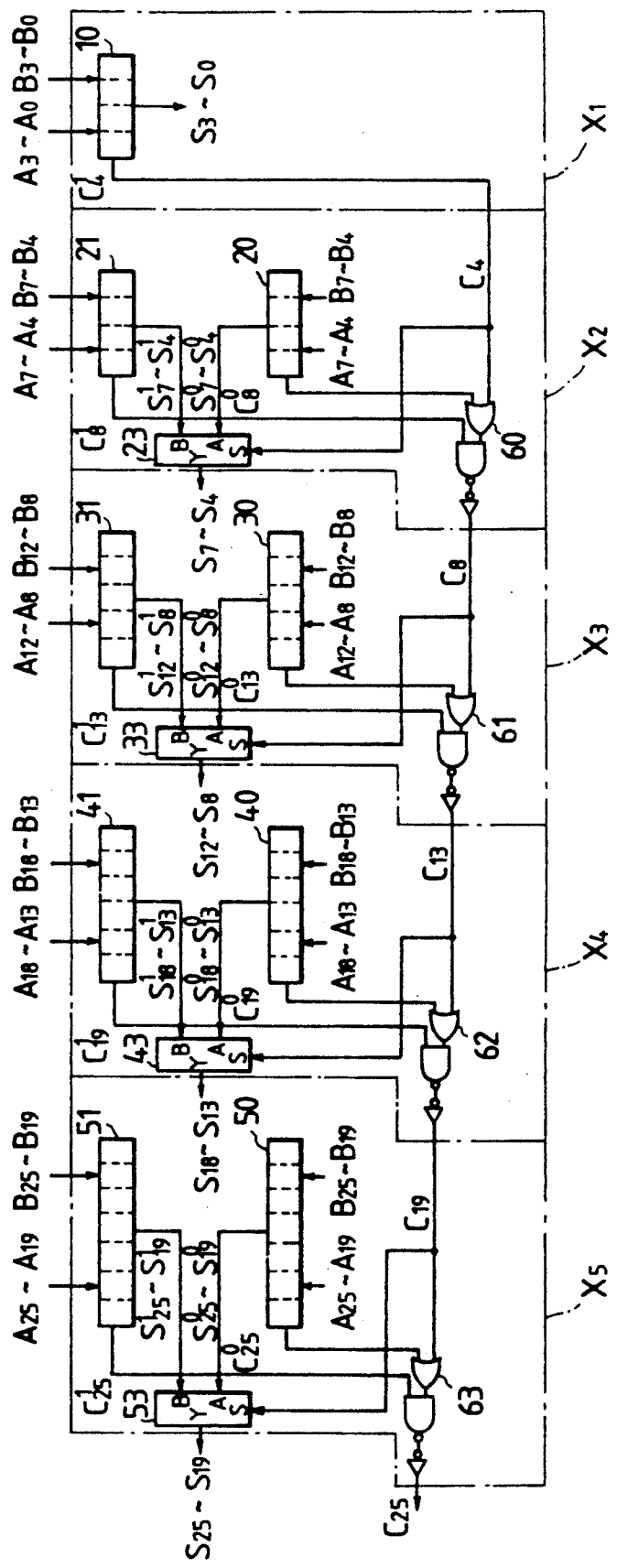
FIG. 3 is a circuit block diagram of a prior art addition apparatus providing high speed of operation by reduced carry propogation time.

FIG. 3 shows an example of a prior art parallel addition circuit which does not have a round-off function, but which provides very high speed of operation. The circuit is formed of a plurality of circuit sections X1 to X5, each of which operates independently of the other sections and (except for the final section X5) generates a section carry signal that is supplied to the succeeding section. In FIG. 3, 21, 31, 41 and 51 denote respective parallel adders, each of which receives "1" as an input carry, while 20, 30, 40 and 50 denote respective parallel adders, each of which receives "0" as an input carry. 23, 33, 43 and 53 denote respective data selectors, 60, 61, 62 and 63 denote section carry generating circuits. The first circuit section X1 is formed of only the parallel adder 10, while the section X2 contains the parallel adders 20, 21 and the data selector 23, which selects either the output result produced from adder 21 or that from adder 20, and the section carry generating circuit 60. The section X3 contains the parallel adders 30, 31 and the data selector 33, which selects either the output result produced from adder 31 or that from adder 30, and the section carry generating circuit 61. The section X4 contains the parallel adders 40, 41 and the data selector 43, which selects either the output result produced from adder 41 or that from adder 40, and the section carry generating circuit 62. The section X5 contains the parallel adders 50, 51 and the data selector 53, which selects either the output result produced from adder 51 or that from adder 50, and the section carry generating circuit 63.

The apparatus of FIG. 3 executes addition of two input data values, which in this example are each assumed to consist of 26 bits, i.e. bits $A_{25}$ to $A_0$ and $B_{25}$ to $B_0$. Each of these is divided into a plurality of data portions, with corresponding portions of each of the input data values being supplied to respective ones of the circuit sections X1 to X5, i.e. the least significant portions A3 to A0, and B3 to B0 which are added together in circuit section X1 by the adder 10, the portions A7 to A4 and B7 to B4 which are added together in the circuit section X2 by the adder 21 and also by the adder 20, the the portions A12 to A8 and B12 to B8 which are added together in the circuit section X3 by the adders 30 and 31, the portions A18 to A13 and B18 to B13 which are added together in the circuit section X4 by the adders 40, 41, and the most significant portions A25 to A19 and B25 to B19 which are added together in the circuit section X5 by the adders 50, 51. The adder 10 produces an output carry C4. The adders 20, 21 of circuit section X2 produce respective output carries $C^1_8$ and $C^0_8$, which are supplied to the section carry generating circuit 60 together with the output carry C4 produced from the preceding circuit section, adders 30, 31 of circuit section X3 produce respective output carries $C^1_{13}$ and $C^0_{13}$, which are supplied to the section carry generating circuit 61 together with the output carry C8 produced from the preceding circuit section, adders 40, 41 of circuit section X4 produce respective output carries $C^1_{19}$ and $C^0_{19}$, which are supplied to the section carry generating circuit 62 together with the output carry C13 produced from the preceding circuit section, and adders 50, 51 of circuit section X5 produce respective output carries $C^1_{25}$ and $C^0_{25}$, which are supplied to the section carry generating circuit 63 together with the output carry C19 produced from the preceding circuit section.

In the circuit section X2, since the addition circuit 21 has a permanent "1" state input carry supplied thereto, it adds together the two data portions A7 to A4 and B7 to B4 to obtain the same output result that would be obtained if the output carry (C4) from adder 10 were applied as an input carry thereto, and that was a "1" state carry. Similarly, the addition circuit 20 has a permanent "0" state input carry supplied thereto, and so adds together the two data portions A7 to A4 and B7 to B4 to obtain the same output result that would be obtained if the output carry (C4) from adder 10 were applied as an input carry thereto, and that was a "0" state carry. Thus, the two possible results that are obtained by parallel addition of the bits A7 to A4, B7 to B4, with either a "1" or a "0" state carry input being applied, are produced respectively from the adder 21 (as the bits $S^1_7$ to $S^1_4$), and from the adder 20 (as the bits $S^0_7$ to $S^0_4$). In a similar way, the two possible results that are obtained by parallel addition of the bits A12 to A8, B12 to B8, with either a "1" or a "0" state carry input being apppplied, are produced respectively from the adder 31 and the adder 30 in circuit section X3, the two possible results that are obtained by parallel addition of the bits A18 to A13, B18 to B13, with either a "1" or a "0" state carry input being applied, are produced respectively from the adders 41 and 40 in circuit section X4, and the two possible results that are obtained by parallel addition of the bits A25 to A19, B25 to B19, with either a "1" or a "0" state carry input being applied, are produced respectively from the adders 51 and 50 in circuit section X4.

In the circuit section X2, the data selector 23 selects the addition result produced from the adder 21 or from the adder 20 in accordance with the state of the output carry C4 produced from the circuit section X1. That is to say, if that carry C4 is in the "1" state, then the output result from the adder 21 is selected to be outputted as the partial result (bits $S_7$ to $S_4$) from the section X2, while if the carry C4 is at the "0" state, then the output result from adder 20 is selected to be outputted by the data selector 23.

The section carry generating circuit 60 combines the output carry C4 from the circuit section X1 with the respective output carries from the adders 20, 21 to produce an output carry C8, which is identical to an output carry that would result from direct parallel addition of the bits A7 to A0 and the bits B7 to B0 of the input data (i.e. if these were to be added in a single continuous parallel adder). The carry outputs from the section carry generating circuits 61, 62, 63 are similarly derived, based on the respective output carries that are generated in each circuit section combined with the output carry generated in the preceding circuit section.

It can be understood that such an addition circuit, consisting of a plurality of parallel addition circuit sections which separately add respective portions of the input data values, enables a higher speed of operation to be achieved than can be achieved with a single parallel addition circuit which directly adds together the two input data values. That is due to the fact that the carry propogation time in such a single circuit will be substantially greater than in the circuit of FIG. 3.

Figure 4:
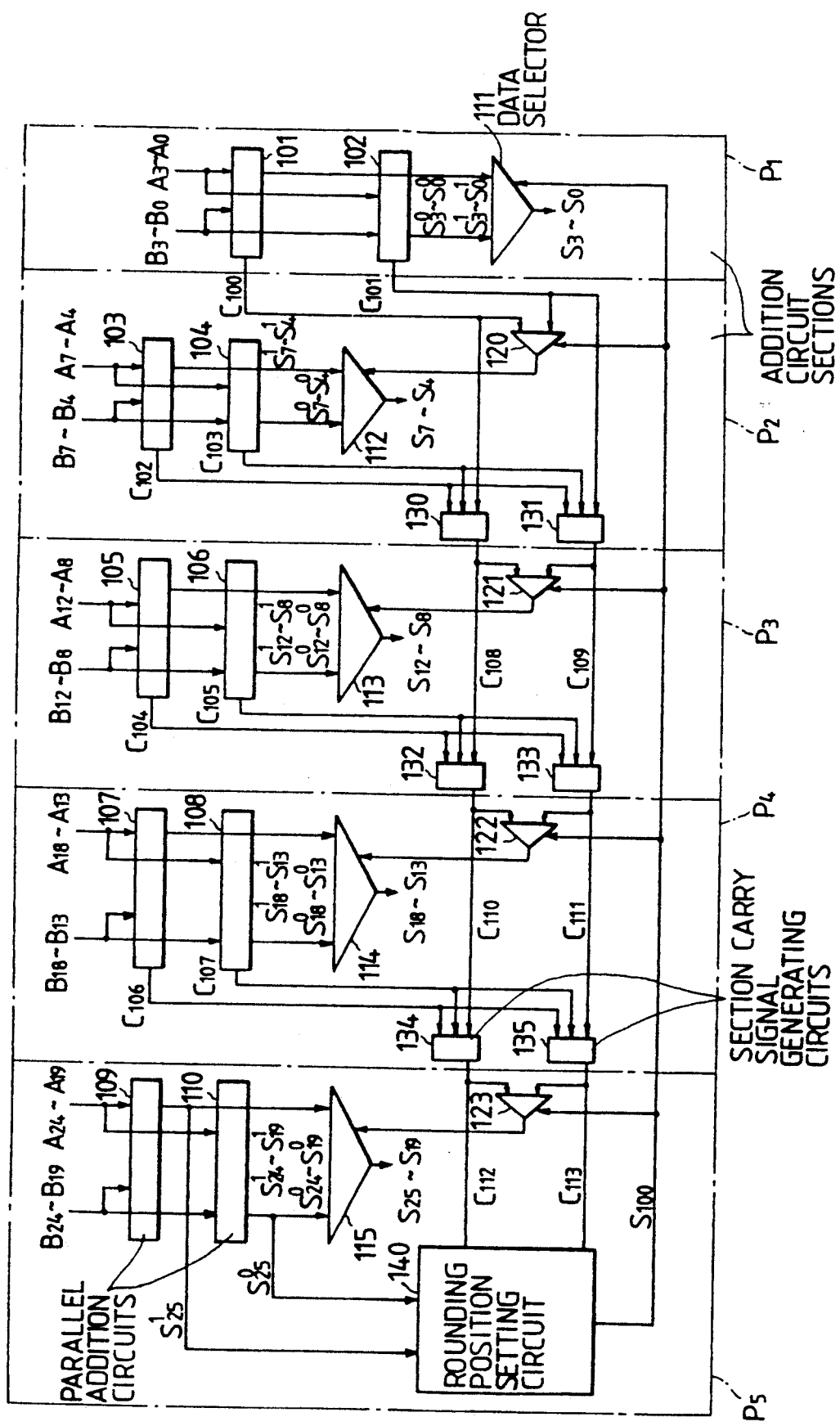
FIG. 4 is a circuit block diagram of a first embodiment of the invention, which is an addition apparatus having a round-off function with two possible round-off bit positions.

FIG. 4 is a circuit block diagram of a first embodiment of the present invention, which is an addition apparatus having a round-off function for adding together two floating-point number mantissas, in a floating-point addition apparatus. With this embodiment two 25-bit input values A24 to A0 and B24 to B0 (where A0, B0 are respective LSBs and A24, B24 are respective MSBs), each of which is normalized to the format *. ** . . . *, are added together while at the same time the appropriate one of two possible round-off bit positions is detected, and round-off by addition of "1" at that position is executed. That is to say, it is assumed that there are only two round-off modes, with the round-off position being determined in accordance with whether or not a carry up from the MSB position occurs as a result of the addition.

The apparatus is divided into five circuit sections designated as P1 to P5 respectively, with each of the two input data values being each divided into five portions which are respectively assigned to these circuit sections to be added together, i.e. with the bits A3 to A0 being added to the bits B3 to B0 in the circuit section P1, the bits A7 to A4 being added to the bits B7 to B4 in the circuit section P2, the bits A12 to A8 being added to the bits B12 to B8 in the circuit section P3, the bits A18 to A13 being added to the bits B18 to B13 in the circuit section P4, and the bits A24 to A19 being added to the bits B24 to B19 in the circuit section P5. Each of the circuit sections P2, P3, P4 are mutually identical in internal configuration, other than differing in respective numbers of bits which are added. The output section P5 differs from the circuit sections P2 to P4 in internal configuration only in further including a round-off position setting circuit 140, described hereinafter, and in not including a pair of section carry generating circuits.

The circuit section P1 includes a parallel adder 101 for adding together the two input data value portions of that section, while adding a "1" state round-off bit to the next-significance bit position above the LSB position (i.e. the A1 bit position), and a parallel adder 102 for adding together the two input data value portions of that section while executing round-off by adding "1" at the LSB position (i.e. the A0 bit position). The circuit sections P2, P3, P4 and P5 include respective parallel adder circuits 103, 105, 107 and 109 each of which adds together the two input data value portions supplied to the circuit section while adding a "1" state input carry bit to the LSB position of that data value portion, and respective parallel adder circuits 104, 106, 108 and 110 each of which adds together the two input data value portions supplied to the circuit section while adding a "0" state input carry bit to the least significant position of that data value portion, i.e. the bit positions A4, A8, A18 and A19 respectively. The circuit sections P1, P2, P3, P4 and P5 further include respective data selector circuits 111, 112, 113, 114 and 115, each being controlled to select one of the two output results produced from the two parallel adders of that circuit section, to be outputted from the circuit section as part of an overall addition result that is made up of bits S24 to S0. That is to say, the data selector circuit 111 selects either the four bits $S^1_3$ to $S^1_0$ that are outputted from the parallel adder circuit 101, or the bits $S^0_3$ to $S^0_0$ that are outputted from the parallel adder circuit 102, to be outputted as the bits $S_3$ to $S^0$. A similar selection operation is executed by each of the other data selector circuits 112 to 115.

The parallel adder circuits 101, 102 of circuit section P1 generate respective output carry bits C100, C101, which are supplied to a bit selector 120 for selecting one of these carry bits to be outputted and applied as a selection control signal to the data selector circuit 112. The carry bits C100, C101 are also respectively inputted to the section carry generating circuits 130, 131 of circuit section P2. The output carry bits C102, C103 produced from the parallel adders 103, 104 of circuit section P2 are also each inputted to both of the section carry generating circuits 130 and 131. The section carry generating circuits 130, 131 generate respective output carry bits C108, C109 which are inputted to a bit selector 121 of the circuit section P3, to obtain an output signal which controls the data selector circuit 113. In a similar manner, based on the outputs C108, C109, and the output carry bits C104, C105 from parallel adders 105, 106 in circuit section P3, output carry bits C110, C111 are generated by the section carry generating circuits 132, 133, and one of these is selected by the bit selector 122 to control the data selector circuit 114. Similarly, based on the output carry bits C110, C111, and the output carry bits C106, C107 from parallel adders 107, 108 in circuit section P4, output carry bits C112, C113 are generated by the section carry generating circuits 134, 135, and one of these is selected by the bit selector 123 to control the data selector circuit 115.

The carry bits selected by the bit selectors 120, 121, 122, 123 are applied to control selection by the data selector circuits 112, 113, 114 and 115 respectively of the output bits produced from the pairs of parallel adders 103, 104 in circuit section P2, parallel adders 105, 106 in circuit section P3, parallel adders 107, 108 in circuit section P4 and parallel adders 109, 110 in circuit section p5. The bits S0 to S25 of the output result are thereby obtained as bits S3 to S0 from circuit section P1, bits S7 to S4 from circuit section p2, bits S12 to S8 from circuit section P3, bits S18 to S13 from circuit section P4, and bits S25 to S19 from circuit section P5.

The parallel adders 109, 110 each add together the input data value portions B24 to B19 and A24 to A19, respectively with and without a "1" state input carry, to obtain respective 6-bit sum outputs $S^1{}_{24}$ to $S^1{}_{19}$ and $S^0{}_{24}$ to $S^0{}_{19}$, and also MSB (carry output) bits $S^1{}_{25}$ and $S^0{}_{25}$ respectively. That is to say, if there is an overflow (carry up) to the next position above the MSB (A24) position of the input data, as a result of the addition executed in parallel adders 109 or 110, then that will be indicated by the corresponding one of the $S^1{}_{25}$ or $S^0{}_{25}$ bits being at the "1" state.

The $S^1{}_{25}$ and $S^0{}_{25}$ bits from parallel adders 109, 110 and the carry bits C112, C113 are inputted to the round-off position setting circuit 140. In response to each of various possible combinations of these input bits, the round-off position setting circuit 140 sets an output control signal S100 to one of two possible states. That signal controls the selection operation of the data selector circuit 111 and of each of the bit selectors 120 to 123. In a first of these states of signal S100, the output bits from the parallel adder 101 are selected by the data selector 111, and the carry bits C100, C108, C110 and C112 are each selected by the bit selectors, i.e. the A1 position is selected as the round-off bit position. In the second of these states of signal S100, the output bits from the parallel adder 102 are selected by the data selector 111, and the carry bits C101, C109, C111 and C113 are each selected by the bit selectors 120 to 123 respectively, i.e. the A0 position is selected as the round-off bit position.

The relationship between the control operation executed by the round-off position setting circuit 140 and combinations of states of the input bit signals supplied to that circuit are as set out in Table 1 below:

TABLE 1

| $S^1{}_{25}$ | $S^0{}_{25}$ | C112 | C113 | Carry up to MSB ? | Round-off bit position |
|---|---|---|---|---|---|
| 0 | 0 | * | * | No | A0 |
| 0 | 1 | * | * | Yes | A1 |
| 1 | 0 | 0 | 0 | No | A0 |
| 1 | 0 | 1 | 0 | No | A0 |
| 1 | 0 | 1 | 1 | Yes | A1 |
| 1 | 1 | * | * | Yes | A1 |

It can be thus understood that when the round-off bit position is detected as A1 by the round-off position setting circuit 140, the control signal S100 is set to the first condition described above, so that the output data from parallel adder 101 of circuit section P1 are selected, as are the carry bits C100, C108, C110, C112, whereas when the round-off bit position is detected as A0 by the round-off position setting circuit 140, the control signal S100 is set to the second condition described above, so that the output data from parallel adder 102 are selected, as are the carry bits C101, C109, C111, C113.

Figure 5:
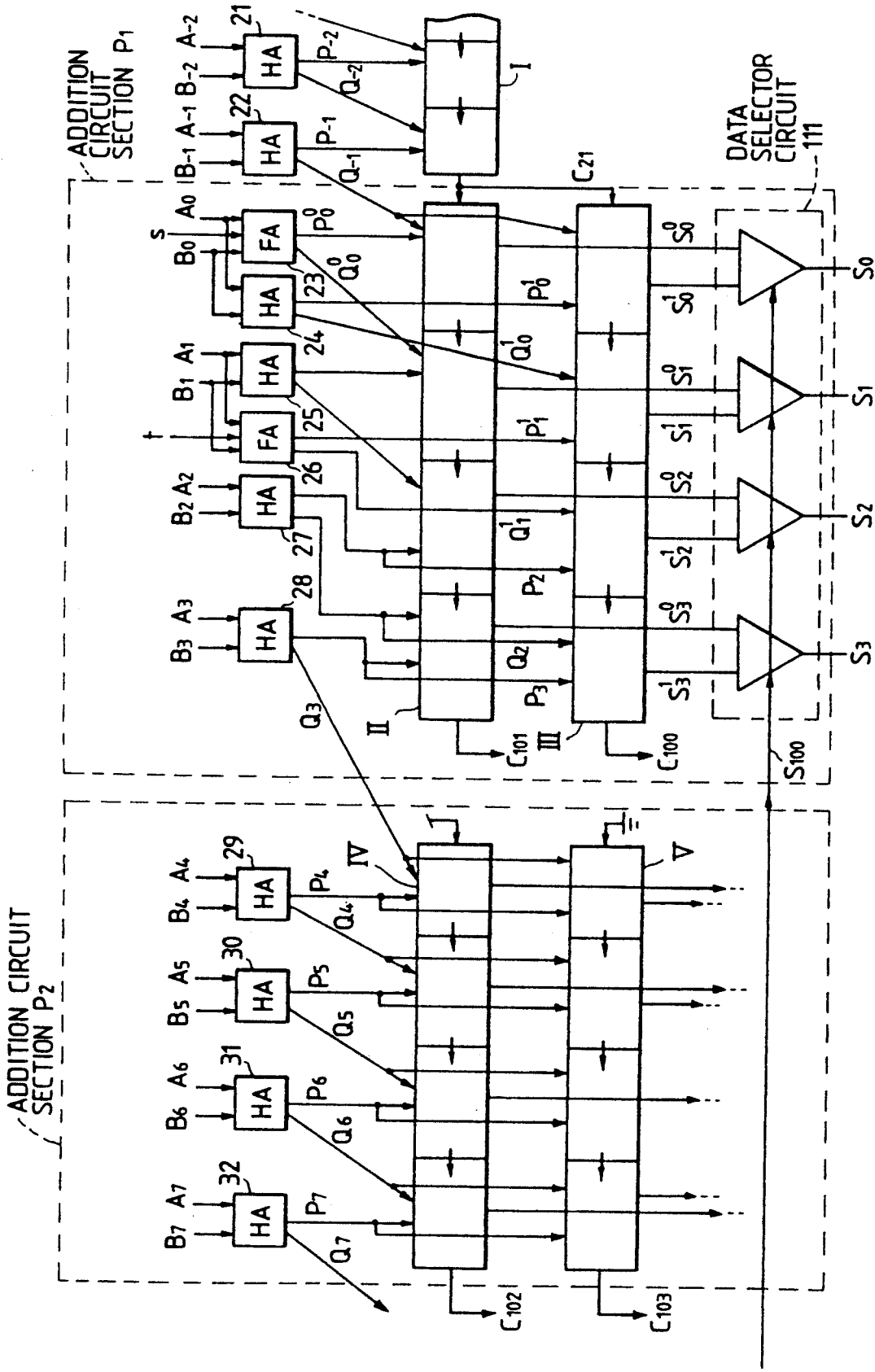
FIG. 5 is a partial circuit diagram showing details of the configuration of the embodiment of FIG. 4.

FIG. 5 is a partial circuit block diagram showing details of the internal configuration of the embodiment of FIG. 4, specifically the adder circuits and data selector circuit of circuit section P1, and the adder circuits in circuit section P2. Input signals s and t in FIG. 2 will be first assumed to be fixed at the "1" level. While the apparatus of FIG. 4 was described on the assumption that each input data value consist of 25 bits, each normalized to the form *.*** ... *, the apparatus is equally applicable to addition of values which include bits that are of lower significance than the normalized LSB position, i.e. the bits A-1, A-2, and B-1, B-2 in FIG. 5. These lower significance bits are added in respective 1-bit half-adders 21 and 22 as shown, with output bits P-2 and P-1 obtained thereby being respectively supplied to the final two stages of a parallel adder circuit I formed of successive stages which consist of successively connected one-bit full adders, in which the carry output of each stage is applied as an input carry to the succeeding stage. The output carry Q-2 from half-adder 21 is supplied to the final stage of adder circuit I, while the carry output Q-1 of half-adder 22 is supplied to an input of a first stage of a parallel adder circuit II, which is similarly configured to the parallel adder circuit I, and consist of 4 stages. An output carry C21 produced from the parallel adder circuit I is applied as an input carry to the adder II and also to a parallel adder circuit III.

A half-adder 24, full adder 26, half-adders 27, 28 and the adder III are interconnected to constitute the parallel adder circuit 101 in FIG. 4. A full adder 23, half-adders 25, 27 and 28, and parallel adder II similarly constitute the parallel adder 102 in FIG. 4. The signal s is inputted together with the input data bits A0, B0 to the full adder 23, whose output and carry bits are inputted to the first and second stages of the parallel adder circuit II respectively. The signal t is inputted together with the input data bits A1, B1 to the full adder 26, whose output and carry bits are inputted to the second and third stages of the parallel adder circuit II respectively. It can thus be understood that if the signals s, t are both fixed at the "1" state, then round-off by addition of "1" is executed at the LSB (A0) bit position in the first stage of the parallel adder circuit II, while round-off is similarly executed at the next bit position above the LSB (i.e. the A1 position) in the second stage of the parallel adder circuit III. The sum bits produced from the full adder 23 and half-adders 25, 27 and 28 are inputted to the first through fourth stages, respectively of the parallel adder circuit II, while the carry outputs of the full adder 23 and half-adders 25 and 27 are inputted to the second through fourth stages respectively of the parallel adder circuit II. The carry output Q3 from the half-adder 28, which adds the bits B3 and A3, is inputted to the first stage of a parallel adder circuit IV in the circuit section P2. In addition, the sum bits produced from the half-adder 24, full adder 26 and the half-adders 27 and 28 are inputted to the first through fourth stages respectively of the parallel adder circuit III, while the carry outputs of the half-adder 24, full adder 26, and half-adder 27, are inputted to the second through fourth stages respectively of the parallel adder circuit III.

The carry bit C21 from the parallel adder circuit I is applied as an input carry to the first stages of each of the circuits II and III, while respective output stages of these circuits produce the output carry bits C101 and C100.

Figure 2:
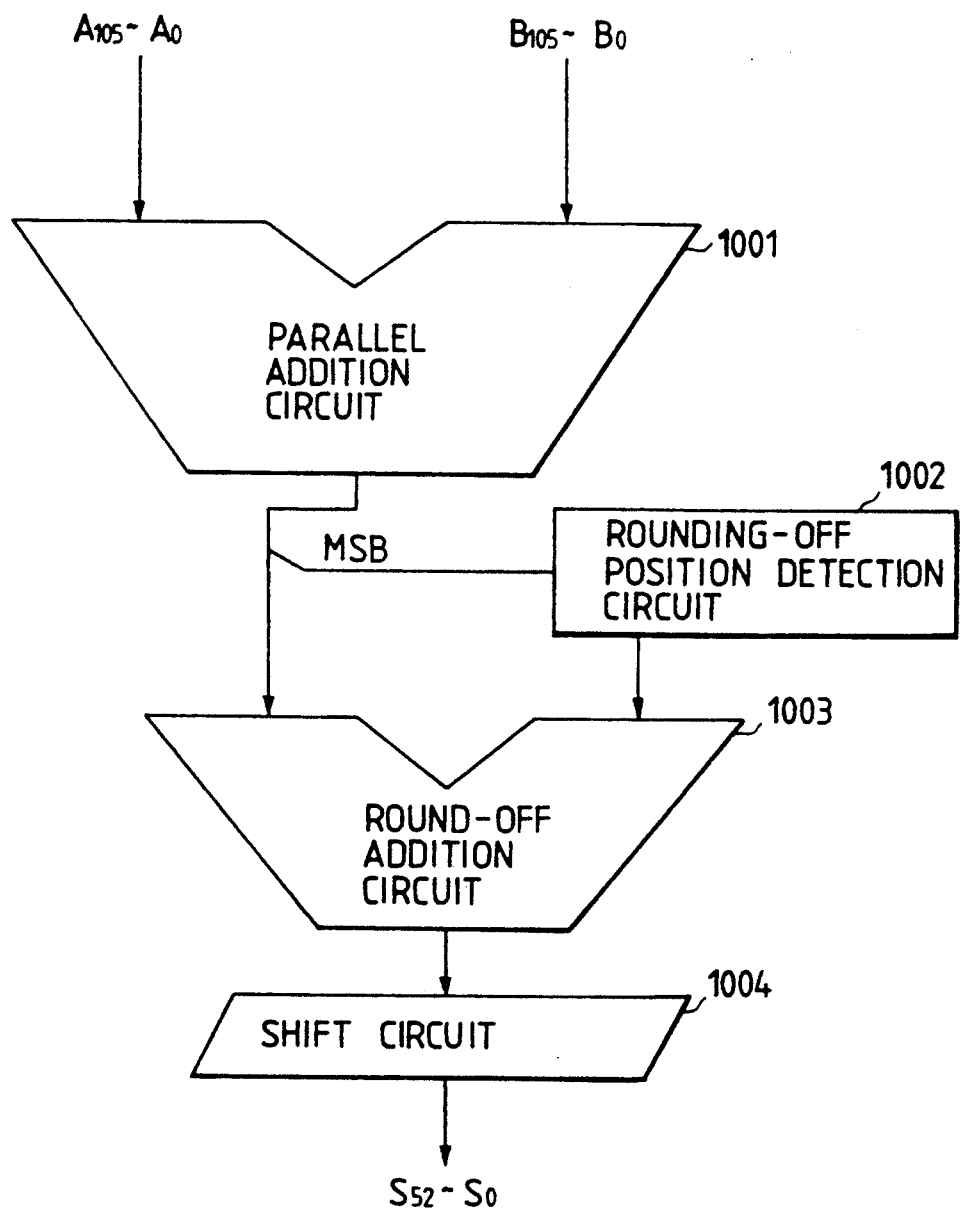
FIG. 2 is a circuit block diagram of a prior art type of addition apparatus having a round-off function.

It can be understood that the adder circuits shown in FIG. 2 for the circuit section P1 will produce (from the four stages of the parallel adder circuit III and of the parallel adder circuit II respectively) the two sets of sum bits $S^1{}_3$ $S^1{}_0$ and $S^0{}_3$ to $S^0{}_0$ shown in FIG. 1, which are inputted to the data selector circuit 111 as shown in FIG. 2.

The carry input terminals of the 2-input adder circuits IV and V in the circuit section P2 are connected to the "1" and "0" potentials respectively, as indicated. It can be understood that the adder circuit 102 in FIG. 1 is constituted by the half-adders 29, 30, 31 and 32 together with the parallel adder circuit IV, in FIG. 2, while the adder circuit 103 is constituted by the half-adders 29, 30, 31 and 32 together with the parallel adder circuit V. The output carry Q7 from half-adder 32 is inputted to a first stage of a parallel adder circuit in circuit section P3, corresponding to the parallel adder circuit IV.

The adder circuits in the circuit sections P3, P4 and P5 are similar to those of P2, shown in FIG. 5, and differ only in respective numbers of input data value bits. It can also be understood that the circuit configuration consists of substantially regularly repeated patterns of circuit elements and connecting leads, so that such an addition apparatus can be easily configured in an integrated circuit chip, with only small numbers of transistors being required.

In the above, it has been assumed that both of the round-off signals s and t in FIG. 5 are fixed at the "1" level, so that there are only two possible round-off modes, i.e. a mode in which 1 is added to the LSB position (by the full adder 23 in circuit section P1 in FIG. 5), and a mode in which "1" is added to the next position above the LSB position (in the full adder 26 of circuit section P1). However it is also possible to control the signal s such as to set that signal to the "0" level and to forcibly cause the round-off position setting circuit 140 to set the control signal S100 such as to select the output bits from the parallel adder circuit II (i.e. equivalent to selecting the output bits from the parallel adder circuit 101 in FIG. 4). A truncation mode can thereby be established, in which no round-off is executed, and the bits S23 to S0 are selected as the final result.

Figure 6:
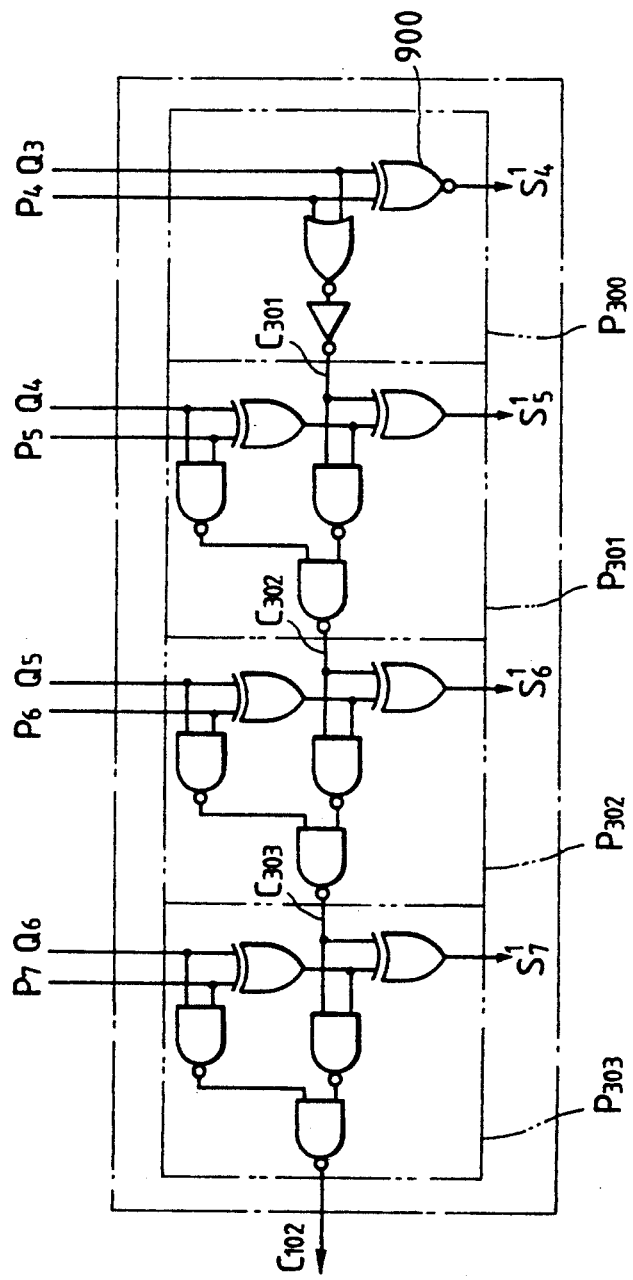
FIGS. 6 and 7 are circuit diagrams of examples of parallel adder circuits for use in circuit sections in the embodiment of FIG. 4.

FIG. 6 shows a specific internal configuration for the parallel adder circuit IV shown in FIG. 5, which forms part of the adder circuit 103 of circuit section P2 in FIG. 4. In FIG. 6, the first through fourth stages of the parallel adder circuit IV are designated as P300, P301, P302 and P303 respectively. Although in FIG. 2 the carry input of the parallel adder circuit IV is shown as being fixedly connected to a "1" level potential, the same effect is obtained by the circuit shown in FIG. 6 for the section P300, i.e. the section provides the same operation as a one-bit full adder having an input carry that is fixed at "1", and which adds together the Q3 (carry output) from the circuit section 111 and the sum bit P4 from the half-adder 29, and produces a sum bit $S^1_4$ and a carry bit C301 which is supplied to the next circuit section P301. In the circuit section P301, the bits P5 and Q4 are adder to the output carry C301, to produce the sum bit $S^1_5$ and carry output C302, in the circuit section P302, the bits P6 and Q5 are added to the output carry C302, to produce the sum bit $S^1_6$ and carry output C303, and in the circuit section P303, the bits P7 and Q6 are added to the output carry C303, to produce the sum bit $S^1_7$ and carry output C102 (shown in FIG. 5).

The configuration of the parallel adder circuit V in FIG. 5 can be almost identical to that of FIG. 6, but with an exclusive-NOR gate 900 that is included in the circuit section P300 of FIG. 6 being replaced by an exclusive-OR gate, to produce the effect of a fixed "0" state input carry being supplied to the parallel adder circuit V.

Figure 7:
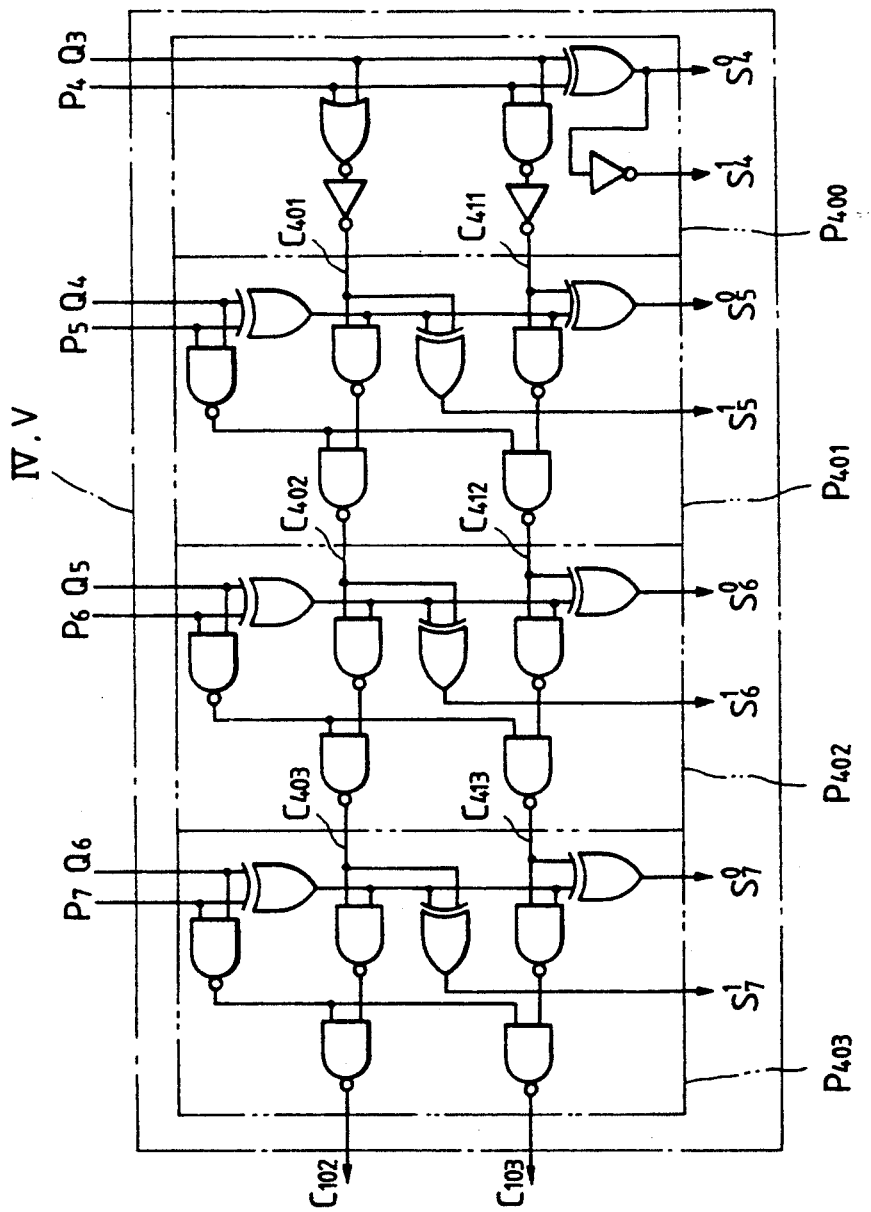

The circuit shown in FIG. 6 is simple, however it is possible to achieve an even simpler overall configuration for the pair of circuits V and IV of FIG. 2, by using some elements in common for both of these circuits, as illustrated in FIG. 7. Here, a single circuit performs the functions of both of the circuits V and IV. Here, the circuit section P400 receives the bits P4, Q3 and produces an output bit $S^1_4$ that is the sum of P4 and Q3 with 1 added, and a corresponding output carry bit C401, and also produces an output bit $S^0_4$ that is the sum of P4 and Q3 with 0 added, and a corresponding output carry bit C411. The circuit section P401 adds together the output carry C401 and the bits P5, Q4, to produce a sum bit $S^1_5$ and a corresponding output carry bit C402, and at the same time produces a bit $S^0_5$ that is the sum of P5, Q4 and the carry bit C411, and outputs a corresponding carry C412. carry C402 and the bits P6, Q5, to produce a sum bit $S^1_6$ and a corresponding output carry C403, and at the same time produces a bit $S^0_6$ that is the sum of P6, Q5 and the carry bit C412, and also outputs a corresponding carry bit C413. The circuit section P403 adds together the output carry C403 and the bits P7, Q6, to produce a sum bit $S^1_7$ and a corresponding output carry C102, and a the same time produces a bit $S^0_7$ that is the sum of P7, Q6 and the carry bit C413, and also outputs a corresponding carry bit C103.

In this way, the parallel adders IV and V in FIG. 5 can be combined into a single circuit having only a small number of transistor elements. In addition, each of the corresponding parallel adders in the circuit sections P3, P4 and P5 can be of almost identical configuration, with a simple repetitive circuit pattern that is highly economical in terms of numbers of circuit elements required and is simple to implement.

Figure 8:
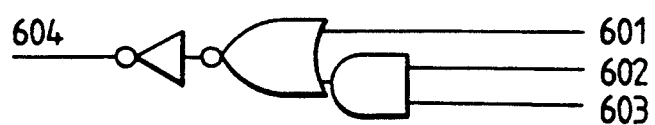
FIG. 8 shows a carry generating circuit used in the embodiment of FIG. 4.

FIG. 8 is a circuit diagram of a suitable configuration for each of the section carry generating circuits 130 to 135 in FIG. 4. Taking for example the case of the circuit 130, the control logic relationships of that circuit are as set out in the following Table 2.

TABLE 2

| C102 | C103 | C100 | C108 |
|------|------|------|------|
| 0 | 0 | 0 | 0 |
| 0 | 0 | 1 | 0 |
| 1 | 0 | 0 | 0 |
| 1 | 0 | 1 | 1 |
| 1 | 1 | * | 1 |

In the above, the "*" symbol indicates a bit which can be either "1" or "0". The condition C102=0, C103=0 in the above table is very unlikely to occur. Thus in FIG. 8, the input signal 601 corresponds to the carry input C103, the input signals 602, 603 respectively correspond to the carry inputs C102 and C100, and as a result the signal 604, corresponding to the output carry C108, is obtained as the output signal.

It can be understood that with the above embodiment, the required sum of two input data values with round-off processing applied is obtained by a single addition operation, whereas with a prior art apparatus having a round-off function (such as that of FIG. 2) it is necessary to execute two successive parallel addition operations. Thus the embodiment provides approximately twice the speed of operation of such a prior art addition apparatus having a round-off function. Considering the total number of transistor elements required in each case, then by comparison with the prior art example of FIG. 3 the number of transistors required in the section carry generating circuits 130 to 135 is approximately twice the number required in the corresponding circuits of that prior art example. However apart from that increase, it is only necessary to add the round-off position setting circuit 140, and the parallel adder circuit 102 and the data selector circuit 111 in the circuit section P1 of FIG. 4. Thus the actual number of circuit elements required by comparison with the prior art is quite small. Moreover, the respective configurations of the addition circuit sections P1, P2, P3 etc. can be extremely similar or identical, so that the circuit layout for implementing such an apparatus is made simple, since a similar logic circuit pattern occurs repetitively.

Figure 9:
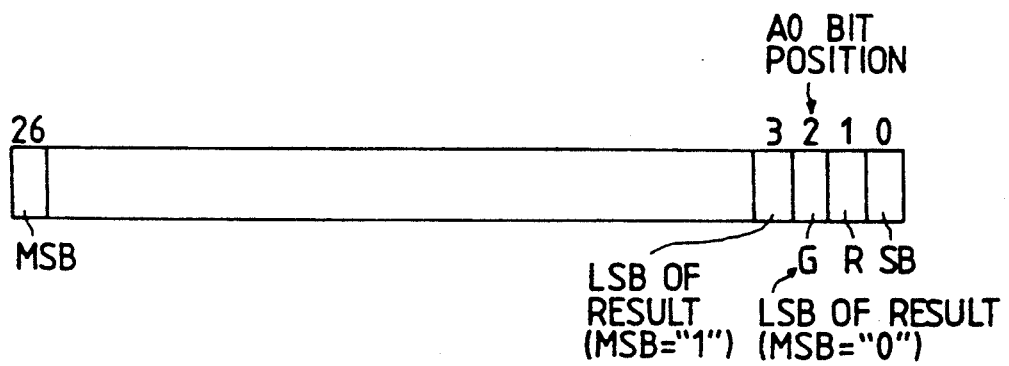
FIG. 9 is a diagram for describing bit designations specified in the ANSI/IEEE round-off standards.

The above embodiment can be easily modified to support the ANSI/IEEE standard methods of round-off processing of intermediate processing results, for example the standard Round to Nearest Even method for round-off. That will be described referring to FIG. 9. Assuming for example that two floating-point numbers each of the form *.** ... * are to be added together and that each number includes bits that are of lower significance than a normalized LSB position of the numbers (e.g. such as the bits A-1, B-1, A-2, B-2) then when these two numbers are added together to obtain an intermediate sum intermediate product that is to be subjected to round-off processing, the form of the uppermost 27 bits of that intermediate sum (after a sticky bit has been derived for that intermediate sum) will be as shown in FIG. 9. Here, bit 2 corresponds in significance to the aforementioned LSB position and that bit is referred to as the guard (G) bit. The bit that is of next lower significance from the guard bit is referred to as the round bit (R), while the bit of next lower significance from the round bit is referred to as the sticky bit (SB), and is obtained as the OR function of all of the bits in the intermediate sum that are of lower significance than the round bit. Bit 26 is the MSB, (corresponding to the $S_{25}$ bit position in FIG. 4), whose state is used as described hereinabove to determine the round-off bit position. Assuming there are two possible round-off positions, these will be the bit 2 position and the bit 3 position in FIG. 9. Thus if the MSB is detected as being in the "1" state by the round-off position setting circuit 140 in FIG. 4, then the set of bits 26 to 3 in FIG. 9 will be outputted as the final result, whereas if the MSB is detected as being "0", then the bits 25 to 2 will be selected as the final result (i.e. with the guard bit then becoming the LSB of the result). In addition, a decision as to whether "1" will actually be added to the selected round-off bit position, or whether "0" will be added instead, is made based upon the combination of states of four specific bits of the intermediate product, i.e. the sticky bit, the round bit, the guard bit, and the next bit above the guard bit (bits 0, 1, 2 and 3 respectively in FIG. 9).

Figure 10:
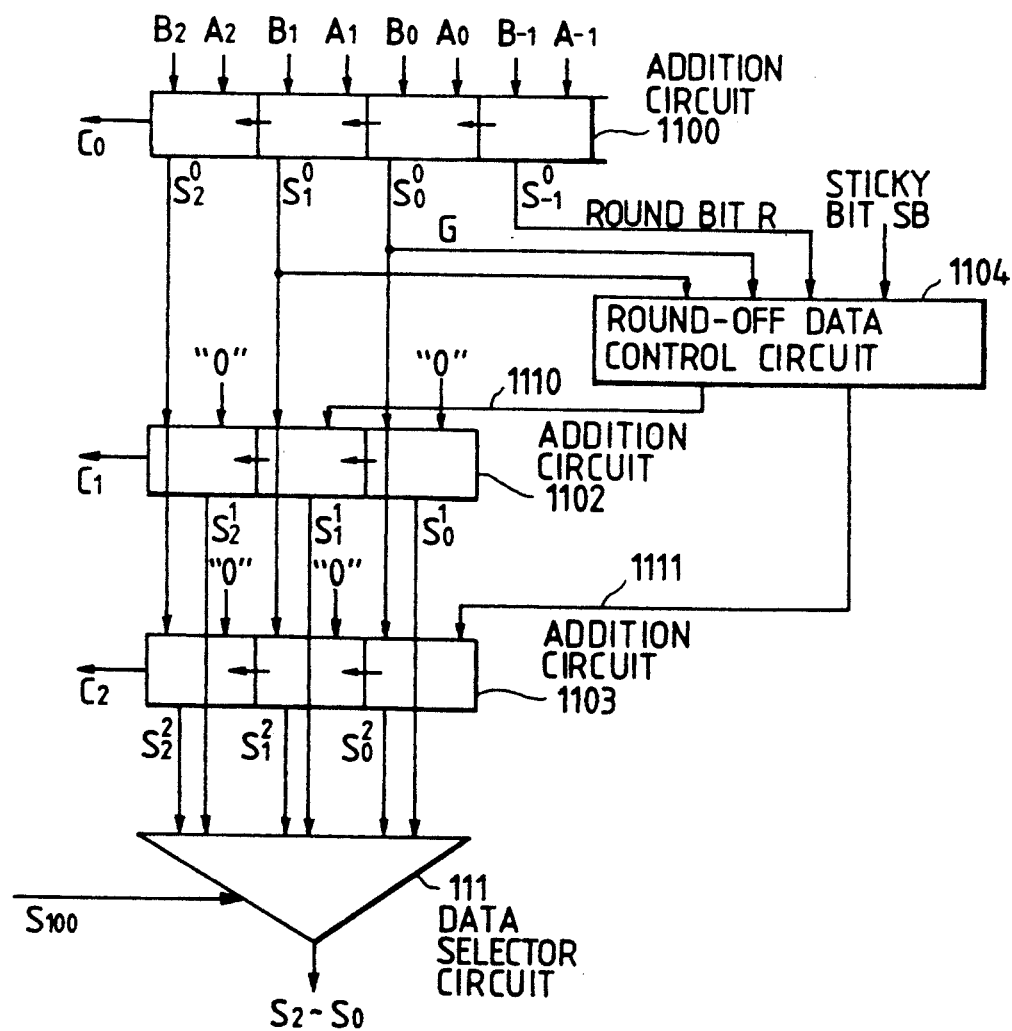
FIG. 10 is a partial circuit diagram of a portion of the embodiment of FIG. 4, modified for executing round-off in accordance with an ANSI/IEEE standard method.

FIG. 10 shows an example of a modified arrangement of part of the circuit of the first embodiment shown in FIG. 5, to show how the circuit of FIG. 5 can be modified, in conjunction with a round-off data control circuit 1104, to execute round-off processing in accordance with the ANSI/IEEE standards. A parallel adder 1100 is formed of four full adder stages, which add the bit pairs A2, B2, A1, B1, A0, B0, A-1, B-1 respectively. The sum bit obtained by adding together bits A0,B0 corresponds to the guard bit G in FIG. 9. Thus, the four specific bits described hereinabove are inputted to the round-off data control circuit 1104x, which thereby supplies output signals 1110 and 1111 that are inputted to the second stage of a 3-stage parallel adder circuit 1102 and to the first stage of a 3-stage parallel adder circuit 1103. The output signals 1110 and 1111 are respectively set to the "1" or "0" states in accordance with predetermined combinations of states of the four input bits supplied thereto, as determined by the ANSI/IEEE floating-point rounding-off standards. It will be clear that a "1" round-off bit will be added in the parallel adder 1103 to the output bit $S^0{}_1$ produced from the parallel adder 1100, if the output signal 1110 from the round-off data control circuit 1104 is at the "1" state, i.e. round-off at the A1 bit position, corresponding to the round-off operation executed by the parallel adder circuit III in FIG. 5, while similarly a "1" round-off bit will be added in the parallel adder 1103 to the output bit $S^0{}_0$ from the adder 1100 if the output signal 1111 from the round-off data control circuit 1104 is at the "1" state, i.e. round-off at the A0 bit position, corresponding to the round-off operation executed by the parallel adder circuit II in FIG. 5.

The output carry C0 produced from the parallel adder 1100, corresponding to the carry bit Q2 in FIG. 5, is supplied (in the same way as Q3 in FIG. 5) to a succeeding section which can be of similar configuration to the circuit section P2 in FIG. 5, but in which the lowest-significance bit pair that are added are A3, B3.

It can thus be understood that by suitably configuring the round-off data control circuit 1104, an ANSI/IEEE standard method of round-off can be executed by modifying the embodiment of FIGS. 4, 5 in accordance with FIG. 10.

The present invention has been described in the above with reference to an addition apparatus having a round-off function with two round-off modes, i.e. in which one of two possible bit positions can be selected for adding 1 to execute round-off. However the invention is equally applicable to an addition apparatus having a round-off function having a greater number of round-off modes. For example, it is possible to use a method in which one of the three bit positions A3, A1 and A0 of a partial processing result is selected as the round-off position (where A0 is the LSB position, as in the circuit of FIG. 5) determined in accordance with a combination of states of the MSB of that intermediate result and the bit immediately below the MSB. In the case of two 24 bit values having been operated on, these will be bits S25 and S24, and the relationship between the states of these bits and the round-off bit position may be for example as shown in Table 3 below.

TABLE 3

| S25 | S24 | A3 | A2 | A0 |
|-----|-----|----|----|----|
| 0   | 0   | 0  | 0  | 1  |
| 0   | 1   | 0  | 1  | 0  |
| 1   | 0   | 1  | 0  | 0  |

Such round-off may for example be executed in a divider apparatus, in which repetitive additions are executed, with the round-off position being successively moved.

Figure 11:
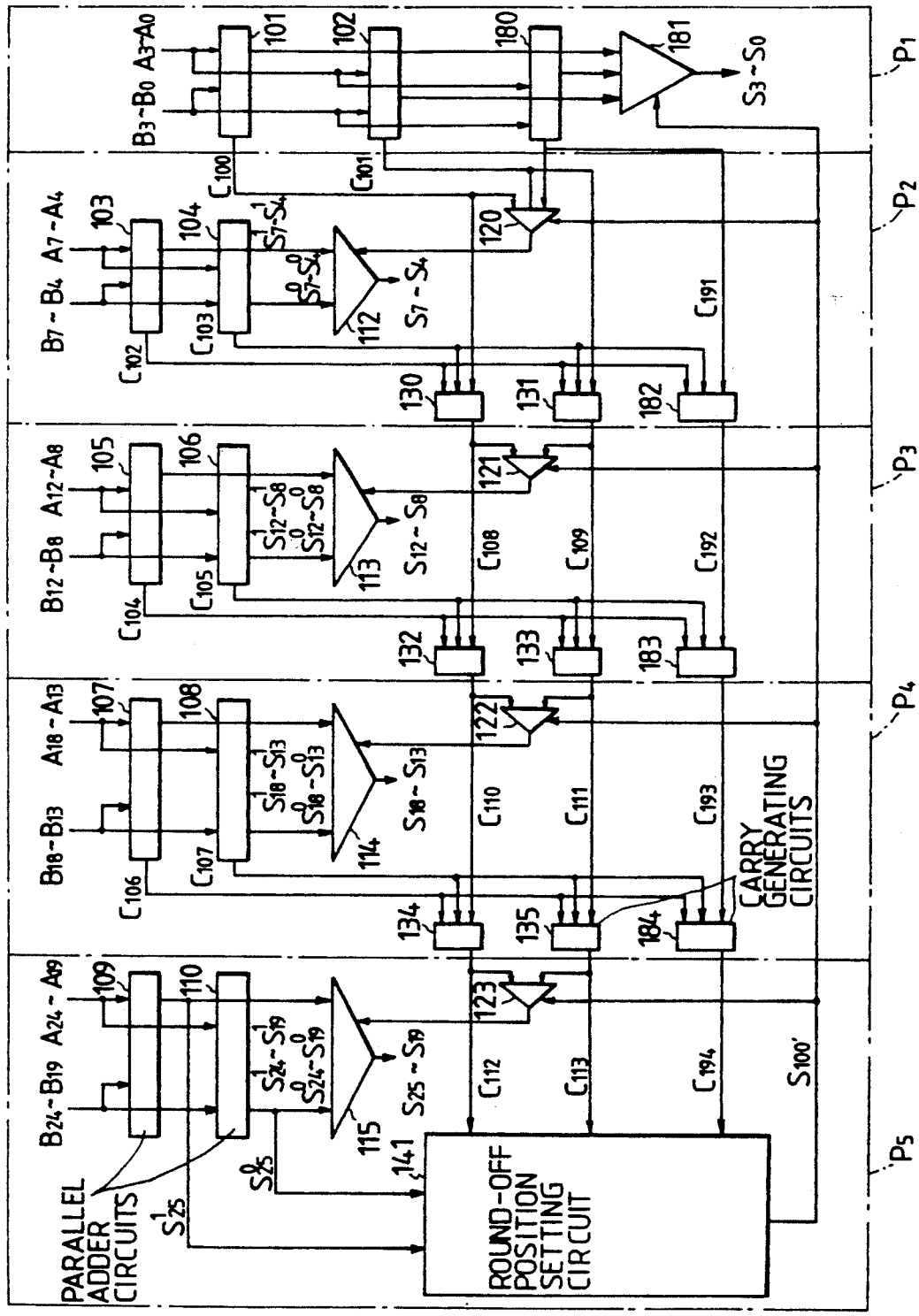
FIG. 11 is a block circuit diagram of a second embodiment of the invention, which which is an addition apparatus having a round-off function with three possible round-off bit positions.

FIG. 11 shows a second embodiment of the present invention, which is an addition apparatus in which the number of possible round-off bit positions is 3, i.e. the number of round-off modes is 3. The three possible round-off bit positions are the A2, A1 and A0 positions (where the A0 position corresponds to the standardized LSB position, i.e. LSB position in the numbers which are added together). As for the embodiment of FIG. 4, this is made of five circuit sections P1 to P5. In circuit section P5, three parallel adder circuits 101, 102 and 180 are provided, which respectively add "1" to the A2, A1 and A0 positions, and one of the the three sets of bits produced from the circuits 101, 102 and 180 are selected by a data selector 181 to be outputted as bits S3 to S0. 130, 131, 132, 133, 134, 135, 182, 183, and 184 are respective section carry generating circuits. 190 to 193 denote respective 3-input/one output bit selectors, for selecting one out of three carry outputs produced from the respective circuit sections.

In this embodiment, a round-off position setting circuit 141 executes round-off position control based on the states of the input bit signals supplied thereto, in accordance with the control logic of the appended Table 4. In Table 4, the 1 indication below one of the bit positions A2, A1, A0 signifies that the position is selected as the round-off position. Thus if for example "1" appears for the position A2, as in the first line of the table, then this signifies that when such a combination of input values is supplied to the round-off position setting circuit 141, then the output sum value from parallel adder 101 will be selected by the data selector circuit 181, and that the carry signals C100, C108, C110 and C112 will be respectively selected.

Figure 12:
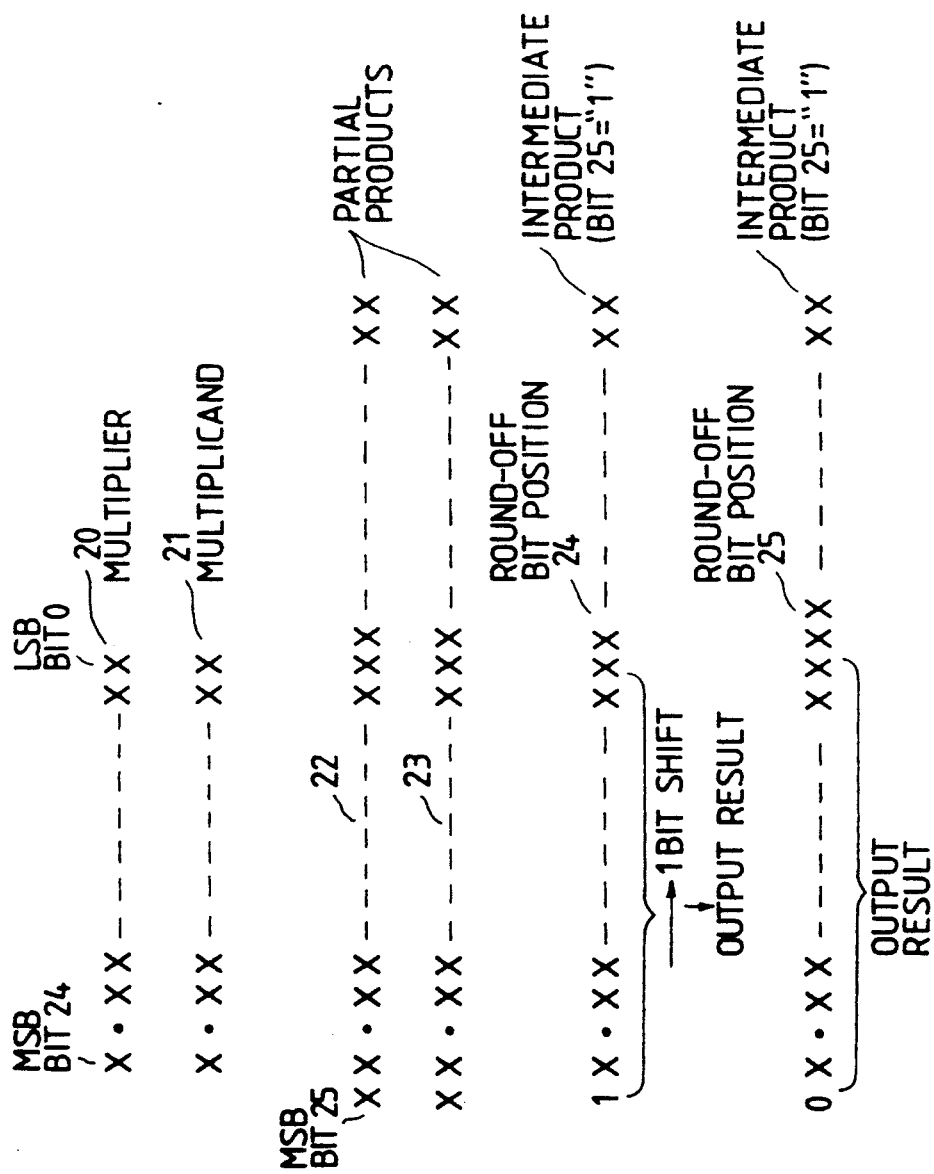
FIG. 12 is a diagram for assistance in describing round-off bit position determination in a floating-point mantissa multiplication operation.

The present invention has been described in the above with reference to embodiments for use in a floating-point addition apparatus. However the invention is also applicable to an addition apparatus having a round-off function for use in a floating-point (mantissa) multiplier apparatus, i.e. for adding together two final partial products that are obtained from a multiplication operation that is executed by repetitive additions of partial products, or a sum value and carry value that are outputted from an array adder, as multiplication partial products, to obtain an intermediate result (intermediate sum or intermediate product) that is to be rounded-off. FIG. 12 illustrates various data values generated in a floating-point (mantissa) multiplication operation. It is assumed that the multiplier and multiplicand are each normalized 25-bit values designated as 20, 21, as shown, with the LSB position designated as bit 0 and the MSB as bit 24. When these are subjected to multiplication processing, the two aforementioned final partial products are obtained, designated as 22, 23 in FIG. 12, in which an MSB bit 25 may be in the "1" state. (In practice, only one of these partial products can have a "1" state MSB). The two partial products are added to obtain an intermediate product 24, in which the MSB (bit 25) may be at the "1" or the "0" state. If that MSB is "1", then the next-highest bit above the LSB (bit 0) position is selected as the round-off bit position, round-off is executed by adding "1" at that position in the intermediate product, then a 1-bit right-shift of the upper 25 bits of the result is executed, to obtain the final product.

If on the other hand the MSB (bit 25) of the intermediate product is found to be "0", then round-off is executed at the LSB (bit 0) position, and the 25 bits including and extending from that LSB position are outputted as the final product.

It can thus be understood that the operation of an addition apparatus having a round-off function for obtaining and executing round-off on an intermediate product in a floating-point multiplication apparatus can be very similar to that of an addition apparatus having a round-off function for addition of two floating-point data values in a floating-point addition apparatus, with the operation differing slightly only with respect to the MSB (position S25 in FIG. 4).

Figure 13:
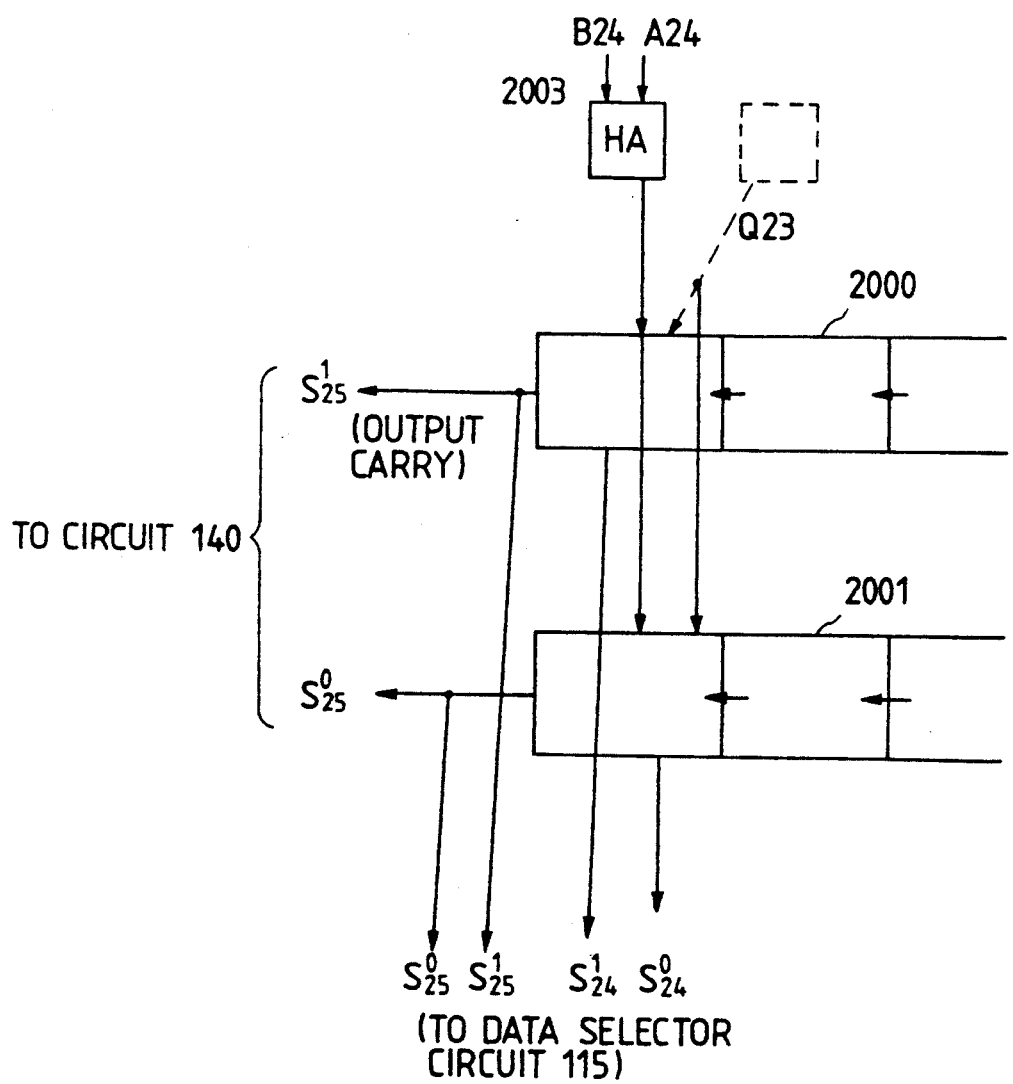
FIG. 13 is a partial circuit diagram illustrating how a MSB bit is generated in the embodiment of FIG. 4.
Figure 14:
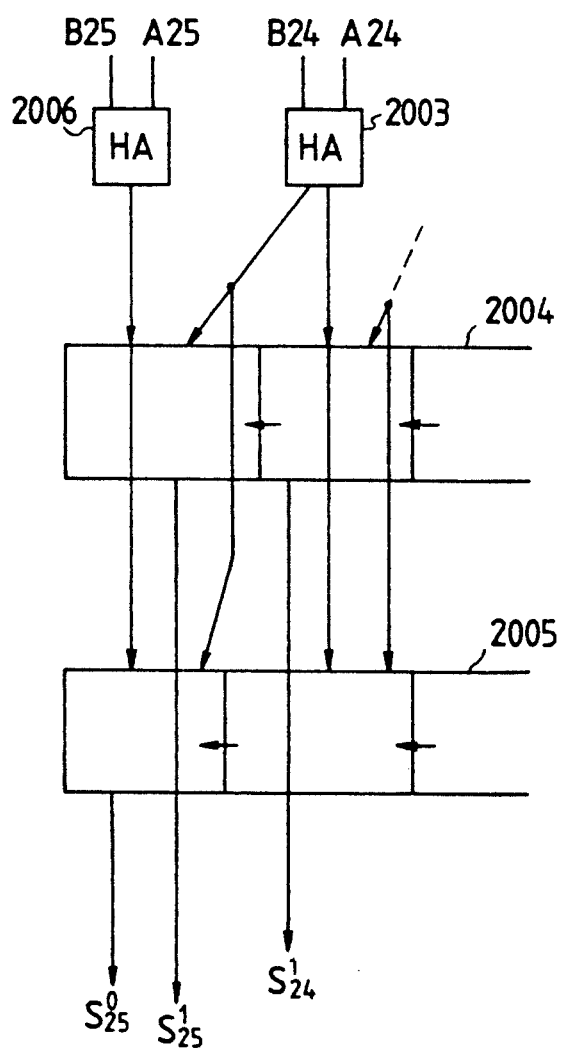
FIG. 14 is a partial circuit diagram for describing a modification of the embodiment of FIG. 4 for use in adding together two partial products in a multiplication apparatus.

More specifically, the internal configuration of the final stages of the addition circuits 109, 110 in FIG. 4 can be as shown in FIG. 13, in which 2003 denotes a final one-bit half-adder in which the input data bits B24, A24 are added, and 2000, 2001 denote respective parallel adders such as the parallel adders IV, V in section P2 shown in FIG. 5. In that case, in which two 24-bit numbers are simply being added, the two bits $S^1_{25}$ and $S^0_{25}$ that are supplied to the round-off position setting circuit 140 are generated as output carry bits. However in the case of an addition circuit used to add together two final partial products to obtain an intermediate product, in a multiplication apparatus, it is also necessary to add together the two MSBs (bit 25 position) of the partial products, as is clear from FIG. 12. Thus it is necessary to add a final half-adder and final stages in each of the two parallel adder circuits of the circuit section P5 of FIG. 4, in order to use that circuit in a multiplication apparatus. Such a modification is shown in FIG. 14, in which an additional half-adder 2006 is provided for multiplying the MSB bits A25, B25 of the partial products, and in which each of the parallel adder circuits 2004, 2005 has one more stage than the parallel adder circuits 2000, 2001 in FIG. 13. In this case, the two bits $S^1_{25}$ and $S^0_{25}$ that are supplied to the round-off position setting circuit 140 are generated as sum output bits from the final stages of the parallel adders 2004 and 2005, respectively.

Figure 15:
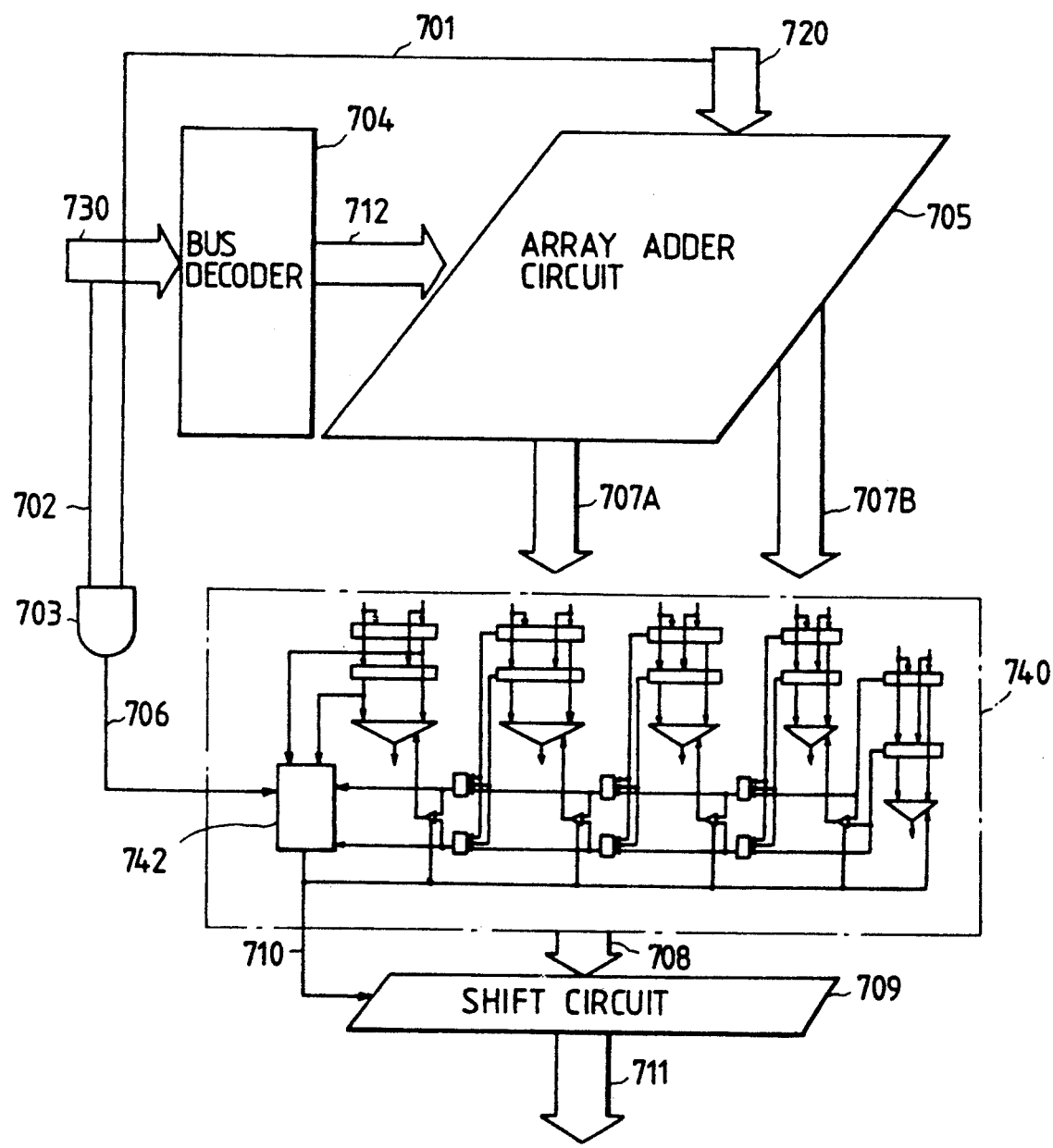
FIG. 15 is a block circuit diagram of a third embodiment of the invention, which is a multiplication apparatus incorporating an addition apparatus having a round-off function with two possible round-off bit positions.

FIG. 15 shows a third embodiment of the present invention, which is a multiplier apparatus for floating-point multiplication. 720 and 730 denote two floating-point numbers that are to be multiplied together, using an array adder circuit 705 in conjunction with an addition apparatus having a round-off function 740. The configuration of the addition circuit 740 is similar to that of the embodiment of FIGS. 4, 5 described hereinabove, but having the final stages of the adder circuits in the circuit section P5 modified as described above referring to FIG. 13. 704 denotes a bus decoder which recievess the input value 730. A shift circuit 709 executes right-shifting of output data produced from addition circuit 740, if necessary, in response to a control signal supplied from the round-off position setting circuit 741 of circuit 740. The array adder circuit 705 produces a sum value and a carry value, as partial products, which are added together by the addition and round-off circuit 740, to obtain an output result 708 that is supplied to the shift circuit 709. The final multiplication result is indicated as 711.

An AND gate 703 receives as inputs the MSBs of the input data values 730 and 720 respectively, and outputs a signal 706 that is inputted to the round-off position setting circuit 741 of the addition circuit 740.

The operation of this embodiment is as follows. The input data value 730 is decoded by the bus decoder 704, and the resultant output value 712 from the bus decoder is combined with the other input data value 720, to obtain successive partial products that are added together. The carry output 707B and sum output 707A that are obtained as final outputs from the array adder circuit 705 are then added together by the addition circuit 740, with round-off processing being also applied in a similar way to that described hereinabove for a floating-point addition apparatus, to obtain the intermediate result 708. That result value 708 is then shifted, if necessary, in the shift circuit 709, and the appropriate bits of the result obtained from the shift operation are selected to obtain a normalized floating-point mantissa product as the final result.

As described above, the partial products that are added by the addition and round-off circuit 740, i.e. the sum output value 707A and the carry output 707B from the array adder circuit 705 are each of the form ,**** ... *, where * denotes either a "1" or "0" bit state. For certain combinations of values of these, for example when the value 707A consists of all "1" bits and value 707B consists of all "0" bits except for the LSB, an erroneous result may be obtained due to carry propogation from the LSB position up to the MSB in the result obtained, if the addition circuit of FIGS. 4, 5 is used directly to add together the values 707A and 707B and detect the rounding position. For that reason, the operation of the round-off position setting circuit 741 is controlled in accordance with the states of the MSBs of the input values 730, 720 that are to be multiplied. The relationships between combinations of input bit conditions of the round-off position setting circuit 741 and the control executed by that circuit are shown in Table 5 below, in which it is assumed that two 25-bit floating-point numbers (bits 24 to 0) each normalized to the form *.** ... * are multiplied together, so that two partial products each of the form . ... * are supplied to the addition circuit 740, with the bit 25 position being the MSB position of each partial product.

TABLE 5

| $S^1_{25}$ | $S^0_{25}$ | C112 | C113 | 706 | Carry up to MSB ? | Round-off bit position |
|---|---|---|---|---|---|---|
| 0 | 0 | * | * | * | No | A0 |
| 0 | 1 | * | * | 0 | No | A0 |
| 0 | 1 | * | * | 1 | Yes | A1 |
| 1 | 0 | 0 | 0 | * | No | A0 |
| 1 | 0 | 1 | 0 | * | No | A0 |
| 1 | 0 | 1 | 1 | * | Yes | A1 |
| 1 | 1 | * | * | * | Yes | A1 |

Figure 16:
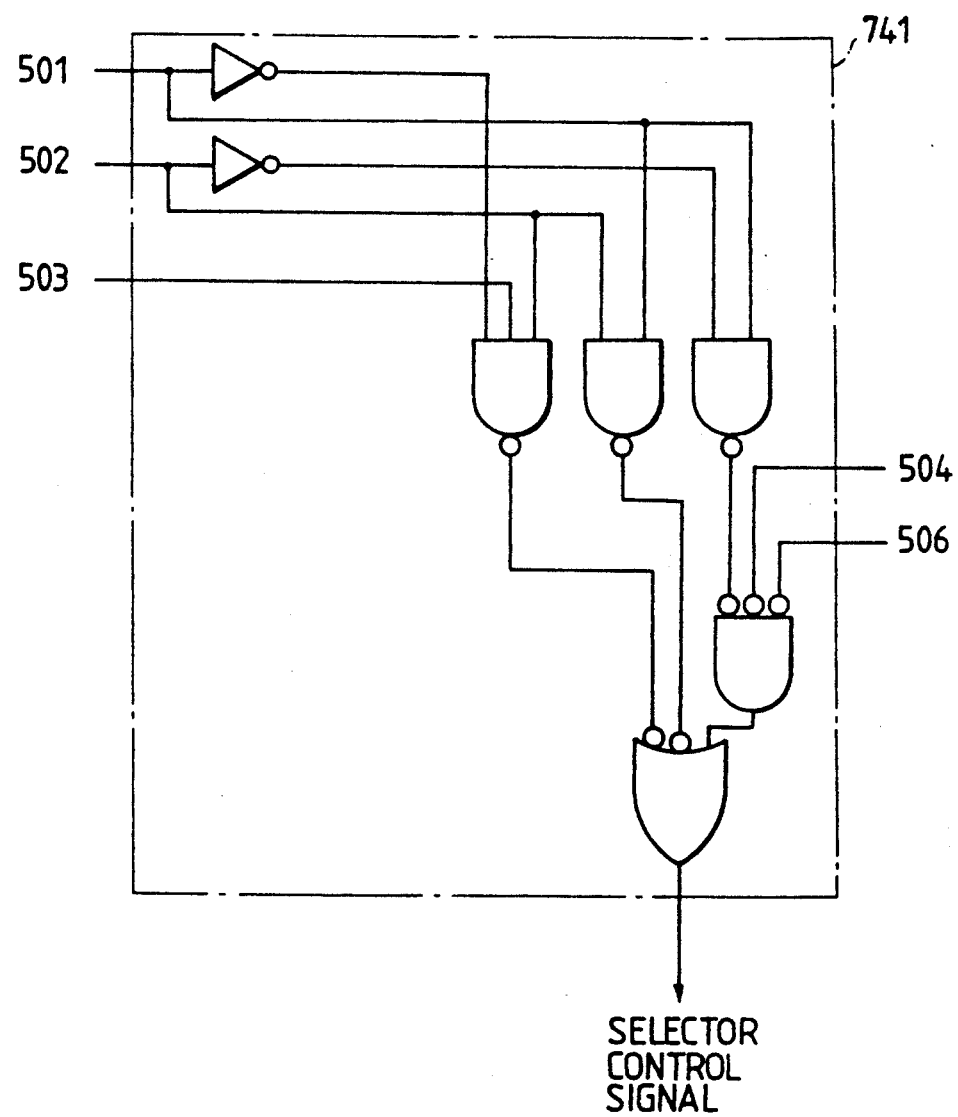
FIG. 16 is a circuit diagram of a round-off position setting circuit used in the embodiment of FIG. 15.

FIG. 16 shows a specific configuration for the round-off position setting circuit 741 of the above embodiment. In FIG. 16, signals 504, 506 correspond to the carry signals C112, C113 respectively, signal 501 corresponds to the sum bit $S^1_{25}$, signal 502 corresponds to the sum bit $^0_{25}$, and signal 503 corresponds to the signal 706.

The above embodiment enables an addition apparatus having a round-off function according to the present invention to be applied to a round-off multiplier apparatus, enabling a high speed of multiplication operation to be achieved.

Figure 17:
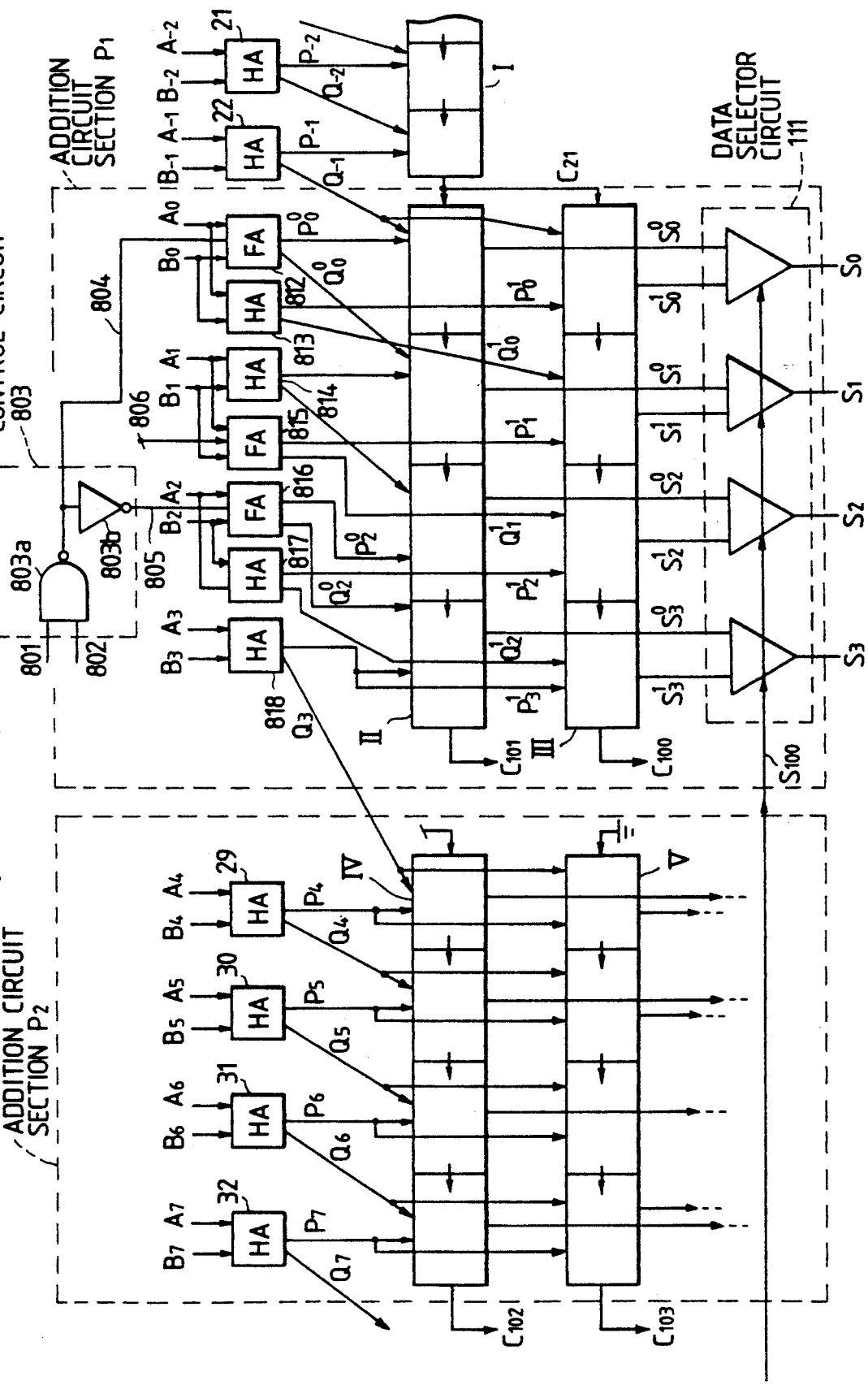
FIG. 17 is a partial circuit diagram of a fourth embodiment of the invention, which is a multiplication apparatus incorporating an addition apparatus having a round-off function with three possible round-off bit positions.

FIG. 17 is a partial circuit diagram of a fourth embodiment of the present invention, which is an addition circuit forming part of a multiplication apparatus, i.e. for adding together two final partial products such as the sum value 707A and carry value 707B of the preceding embodiment. The overall configuration of this embodiment is similar to that of the first embodiment of FIGS. 4, 5 described hereinabove, but with circuits 109, 110 of section P5 in FIG. 4 each having an additional stage, for adding together the MSBs of the two partial products that are to be added together, as described hereinabove referring to FIG. 14. Apart from that, only the configuration of the circuit section P1 is different from that shown in FIG. 5, as is illustrated in FIG. 17. In FIG. 17, 810, 811, 813, 814, 817, 818, 819 and 820 are one-bit half-adders, 812, 815 and 816 are one-bit full adders, while the input and output signal designations A0, B0, etc. and $P^1_0$, $Q^1_0$ etc, are as used in the embodiment of FIGS. 4, 5. With this embodiment, a "1" state potential is fixedly applied to one input of the full adder 815, so that a "1" is added for round-off at the A1 bit position, by the parallel adder III which receives the sum output from the full adder 815 as one input to the second stage thereof, with the carry output from the half-adder 813 being applied to the other input of that stage of parallel adder III. The input signals 801, 802 that are applied to a NAND gate 803a of a round-off position control circuit 803 represent the states of the MSBs of the two data values that are to be multiplied together, i.e. correspond to the signals 701, 702 in the embodiment of FIG. 15. The output signal from the NAND gate 803a is applied through an inverter 803b, as signal 805, to one input of the full adder 816, and is also applied directly to one input of the full adder 812.

The operation of a multiplication apparatus incorporating the circuit of FIG. 17 is as follows. Assuming that the two data values that are to be multiplied can each be of the form 1.***** ...  or 0.**** ... , the intermediate product that is obtained (i.e. by adding together the two partial products that are inputted to the circuit of FIG. 17) will be of the form 1*.*** ... , 01.**** ... , or 00.*** ... *. In some cases, it is necessary to select one of three possible round-off bit positions, in accordance with these three combination of states of the two leading bits of the intermediate product, for example as shown in Table 3 above. If an addition apparatus of the form of FIGS. 4 and 5 were to be modified to support three round-off modes, then it would normally be necessary to provide three parallel adder circuits in the circuit section P1, and to provide an addition section carry generating circuit in each of the circuit sections P2 to P5 of FIG. 4, for example as is done in the embodiment of FIG. 11 described hereinabove. However in the case of a multiplication apparatus, it is possible to overcome that problem, by selecting one of two possible pairs of round-off bit positions, based upon the combination of MSB states of the data values that are multiplied, and to select one of these two round-off bit positions by the operation of the round-off position setting circuit 140. Thus with the embodiment of FIG. 17, a round-off "1" bit can be added at the A0 bit position by the parallel adder II (from the outputs of the full adder 812, if the signal 804 from the round-off position control circuit 803 is at the "1" state), or added by the parallel adder II at the A2 position (from the outputs of the full adder 816, if the signal 805 from the round-off position control circuit 803 is at the "1" state), while a round-off "1" bit can be added at the A0 position by the parallel adder III (if the signal 804 is at the "1" state). The following table relates the states of the input signals 801, 802 of the round-off position control circuit 803 and the possible round-off positions.

TABLE 6

| 801 | 802 | A2 | A1 | A0 |
|---|---|---|---|---|
| 0 | 0 | 0 | 0 | 1 |
| 0 | 1 | 0 | * | * |
| 1 | 0 | 0 | * | * |
| 1 | 1 | * | * | 0 |

In Table 6, a "1" indication below A2, A1 or A0 indicates that rounding is executed at that bit position.

It can thus be understood that the embodiment of FIG. 17 provides two possible sets of round-off bit positions, i.e. (A2, A1) when the output signals 804, 805 from the round-off position control circuit 803 are at the "1" and "0" states respectively, and (A1, A0) when the signals 804, 805 are at the "0" and "1" states respectively, with these states of signals 804, 805 being determined by the combination of states of the MSBs of the two values that are being multiplied (e.g. the values 730, 720 in FIG. 15). Thus, by selecting the sum output and carry output from one of the parallel adders II, III by control signals generated from the round-off position setting circuit 140 as described hereinabove for the embodiment of FIGS. 4, 5, it becomes possible for the apparatus to select the appropriate one out of three possible round-off bit positions, i.e. A2, A1 or A0.

In addition to the very small amount of additional circuit elements that are required to provide an additional round-off position with the embodiment of FIG. 17, by comparison with an addition apparatus having a round-off function which provides only two possible round-off bit positions, the embodiment of FIG. 17 also has the advantage that there is no penalty of decreased speed of operation as a result of the modification. That is to say, the signals 801, 802 are available at the start of the multiplication operation, so that there is no waiting time before the signals 804, 805 can be used in conjunction with the partial product data A1, B1, A0, B0 etc.

It should be noted that although in the above, two slightly different configurations have been described with reference to FIGS. 13 and 14 for an addition apparatus for adding together two normalized floating-point (mantissa) numbers and an addition apparatus for adding together two partial products obtained in a floating-point multiplication apparatus, it is possible to use the circuit of FIG. 14 in common for both types of addition apparatus. That is to say, when two 24-bit numbers are added together, the bits A25, B25 in FIG. 14 will both be absent, i.e. "0" values will apply for each of these. Thus, the result obtained will be identical to that obtained with the circuit of FIG. 13, if the carry output from half-adder 2003 in FIG. 14 is suppressed.

Furthermore, although the embodiments have been described for the case in which a plurality of intermediate addition circuit sections (P2 to P4) are disposed between first and final circuit sections (P1 and P5), it would of course be equally possible to provide only a single intermediate circuit section.

TABLE 4

| $S^1_{25}$ | $S^0_{25}$ | $S^1_{25}$ | $S^0_{25}$ | C112 | C113 | C194 | A2 | A1 | A0 |
|---|---|---|---|---|---|---|---|---|---|
| 1 | 1 | * | * | * | * | * | 1 | 0 | 0 |
| 1 | 0 | * | * | 1 | 1 | * | 1 | 0 | 0 |
| 1 | 0 | * | * | 0 | 0 | * | 0 | 1 | 0 |
| 1 | 0 | * | * | 1 | 0 | * | 0 | 1 | 0 |
| 0 | 1 | * | * | * | * | * | 1 | 0 | 0 |
| 0 | 0 | 1 | 1 | * | * | * | 1 | 1 | 0 |
| 0 | 0 | 1 | 0 | * | 1 | 1 | 0 | 1 | 0 |
| 0 | 0 | 1 | 0 | * | 1 | 0 | 0 | 0 | 1 |
| 0 | 0 | 1 | 0 | * | 0 | 0 | 0 | 0 | 1 |
| 0 | 0 | 0 | 0 | * | * | * | 0 | 0 | 1 |

What is claimed is:

1. An addition apparatus having a round-off function for adding together first and second input binary numbers (A24 to A0, B24 to B0) and executing round-off processing of a result of an addition performed thereby, comprising:

a first circuit section (P1) including n parallel adders (101, 102) where n is a fixed plural integer, each parallel adder coupled to add together respective first portions (A3 to A0, B3 to B0) of said input numbers, each said first portion of said input numbers comprising a fixed number of bits extending from and including a bit (A0, B0) corresponding to a normalized least significant bit position of said input numbers, said parallel adders being operable for executing round-off addition at n respectively different bit positions (A1, A0), and said parallel adders generating n respective carry output signals which are outputted from said first circuit section as respective section carry output signals (C100, C101), said first circuit section further including data selector means controllable for selecting one out of n respective sets of bits constituting sum results produced from said n parallel adders of the first circuit section and for outputting the selected set of bits constituting one of the sum results (S3 to S0);

a plurality of intermediate circuit sections (P2, P3, P4) coupled to receive respective pairs of intermediate numeral portions (A7 to A4, B7 to B4, ... A18 to A13, B18 to B13) of said input numbers, said pairs of intermediate numeral portions successively increasing in significance above said first portions, each intermediate circuit section of said plurality of intermediate circuit sections including a first parallel adder (103) for adding together a pair of intermediate numeral portions supplied to said intermediate circuit section while fixedly adding a "1" state input carry thereto, and a second parallel adder (104) for adding together the pair of numeral portions supplied to said intermediate circuit section while fixedly adding a "0" state input carry thereto, data selector means (112) controllable for selecting one out of 2 respective sets of bits constituting sum results produced from said first and second parallel adders (103, 104) of said intermediate circuit section and for outputting the selected set of bits constituting said sum result (S7 to S4), carry selector means (120) operable for selecting one out of n carry signals supplied from a preceding one of said circuit sections and for applying the selected carry signal to control said data selector means (112), and n section carry generating circuits each receiving respective carry output signals produced from said first and second parallel adders (103, 104) and a corresponding one of n carry output signals produced from a preceding one of said circuit sections, for generating n respective carry output signals; and a final circuit section coupled to receive respective most significant portions (A24 to A19, B24 to B19) of said input numbers, including a first parallel adder (109) for adding together said most significant portions while fixedly adding a "1" state input carry thereto, and a second parallel adder (110) for adding together said most significant portions while fixedly adding a "0" state input carry thereto, data selector means (115) controllable for selecting one out of 2 respective sets of bits each constituting a carry bit ($S^1_{25}$, $S^0_{25}$) and sum result ($S^1_{24}$, $S^0_{24}$ to $S^1_{19}$, $S^0_{19}$) produced from said first and second parallel adders (109, 110) of said final circuit section and for outputting the selected set of bits (S25 to S19), carry selector means (123) operable for selecting one out of n carry signals (C112, C113) supplied from a preceding one of said circuit sections and for applying a selected carry signal to control said data selector means (115), and round-off position setting circuit means (140) coupled to receive said n carry signals (C112, C113) supplied from the preceding one of said circuit sections and to receive respective most significant bits ($S^1_{25}$, $S^0_{25}$) that are produced as carry output from said first and second parallel adders (109, 110) of said final circuit section, and including logic circuit means responsive to a combination of logic states of said input carry signals (C112, C113) and most significant bits for producing corresponding output signals (S100) for controlling said respective data selector means and said carry selection means of said circuit sections, to thereby determine a position at which round-off processing has been executed, to thereby obtain an output result formed of the output bits (S25 to S0) produced from all of said data selector means.

2. An addition apparatus according to claim 1 wherein said first circuit section, said plurality of intermediate circuit sections and said final circuit section in combination comprise means for executing a round-off process during an addition of two binary values, independently of additional circuitry for executing the round-off process.

3. In a multiplier apparatus for multiplying together first and second input binary numbers (720, 730), including circuit means (704, 705) for operating on data values respectively representing said input numbers to generate first and second partial products (707A, 707B) each having a most significant bit (A25, B25) that is one bit higher in significance than a most significant bit position (A24, B24) of said input numbers, an addition apparatus having a round-off function for adding together and executing round-off processing of a result of the addition, comprising:

a first circuit section (P1) including n parallel adders where n is a fixed integer, each parallel adder coupled to add together respective first portions (A3 to A0, B3 to B0) of said partial products each said first portion of said partial products comprising a fixed number of bits extending from and including a bit (A0, B0) at a least significant bit position of said partial products, said parallel adders being operable for executing round-off addition at n respectively different bit positions (A1, A0), and said parallel adders generating n respective carry output signals which are outputted from said first circuit section as respective section carry output signals (C100, C101), said first circuit section further including data selector means controllable for selecting one out of n respective sets of bits constituting sum results produced from said n parallel adders of the first circuit section and for outputting the selected set of bits constituting one of the sum results (S3 to S0);

a plurality of intermediate circuit sections (P2, P3, P4) coupled to receive respective pairs of intermediate numeral portions (A7 to A4, B7 to B4, ... A18 to A13, B18 to B13) of said partial products, said pairs of intermediate numeral portions successively increasing in significance above said first portions, each intermediate circuit section of said plurality of intermediate circuit sections including a first parallel adder for adding together a pair of intermediate numeral portions supplied to said intermediate circuit section while fixedly adding a "1" state input carry thereto, and a second parallel adder for adding together the pair of numeral portions supplied to said intermediate circuit section while fixedly adding a "0" state input carry thereto, data selector means controllable for selecting one out of 2 respective sets of bits constituting sum results produced from said first and second parallel adders of said intermediate circuit section and for outputting the selected set of bits constituting said sum result (S7 to S4), carry selector means (120) operable for selecting one out of n carry signals supplied from a preceding one of said circuit sections and for applying the selected carry signal to control said data selector means, and n section carry generating circuits each receiving respective carry output signals produced from said first and second parallel adders and a corresponding one of n carry output signals produced from a preceding one of said circuit sections, for generating n respective carry output signals; and a final circuit section coupled to receive respective most significant portions (A25 to A19, B25 to B19) of said partial products, including a first parallel adder for adding together said most significant portions while fixedly adding a "1" state input carry thereto, and a second parallel adder for adding together said most significant portions while fixedly adding a "0" state input carry thereto, data selector means controllable for selecting one out of 2 respective sets of bits constituting sum results produced from sadi first and second parallel adders of said final circuit section and for outputting the selected sum result (S25 to S19), carry selector means operable for selecting one out of n carry signals supplied from a preceding one of said circuit sections and for applying a selected carry signal to control said data selector means, and round-off position setting circuit means coupled to receive said n carry signals supplied from the preceding one of said circuit sections and to receive said most significant bits ($S^1_{25}$, $S^0_{25}$) respectively produced from said first and second parallel adders of said final circuit section, and including logic circuit means responsive to a combination of logic states of said input carry signals (C112, C113) and most significant bits for producing corresponding output signals for controlling said respective data selector means and said carry selection means of said circuit sections, to thereby determine a position at which round-off processing has been executed, to thereby obtain an output result formed of the output bits (S25 to S0) produced from all of said data selector means.

4. A multiplier apparatus according to claim 3, and further comprising logic circuit means (703) responsive to a combination of states of respective most significant bits (701, 702) of said input numbers for producing an output signal (706) to be supplied to said round-off position setting circuit, and in which said round-off position setting circuit is responsive to a combination of logic states of said output signal (706), said input carry signals (C112, C113) and said most significant bits produced from said first and second parallel adders of said final circuit section for producing said output signals (S100) for controlling said respective data selector means and said selection means, 5. A multiplier apparatus according to claim 3, and further comprising logic circuit means (803) responsive to a combination of states cf respective most significant hits (801, 802) of said input numbers for producing output signals for selectively setting a round-off position of at least one of said parallel adders of said first circuit section (P1) to one of a plurality of respectively different bit positions in accordance with said combination of states, for thereby selectively establishing at least two respectively different sets of round-off positions in accordance with said combination of states.

6. A multiplier apparatus according to claim 3 wherein said first circuit section, said plurality of intermediate circuit sections and said final circuit section of said addition apparatus together operate, in combination, for executing a round-off process during an addition of two partial products, independently of additional circuitry for executing the round-off process.

* * * * *